Dec. 30, 1952 C. R. BERNHAG 2,623,453
TAB SENSING MEANS IN ADDRESS PRINTING MACHINES
Filed March 12, 1947 15 Sheets-Sheet 1

Inventor
Carl R. Bernhag
By Wallace and Cannon
Attorneys

Dec. 30, 1952                 C. R. BERNHAG                 2,623,453
TAB SENSING MEANS IN ADDRESS PRINTING MACHINES
Filed March 12, 1947                                              15 Sheets-Sheet 2
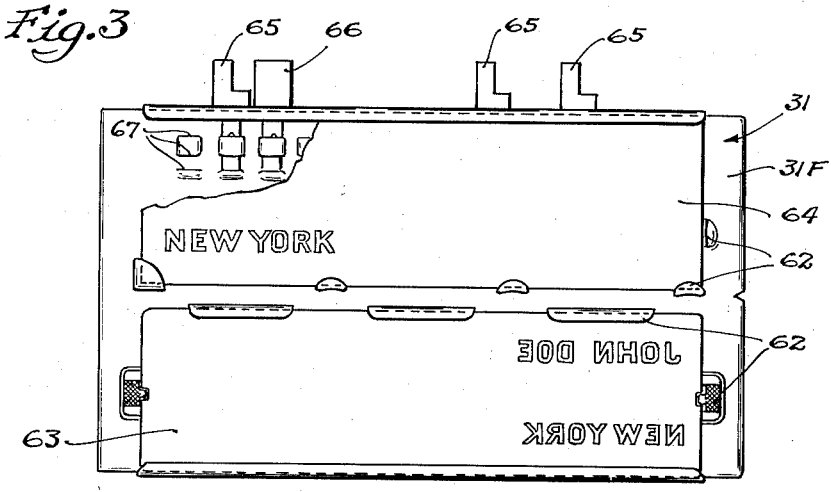
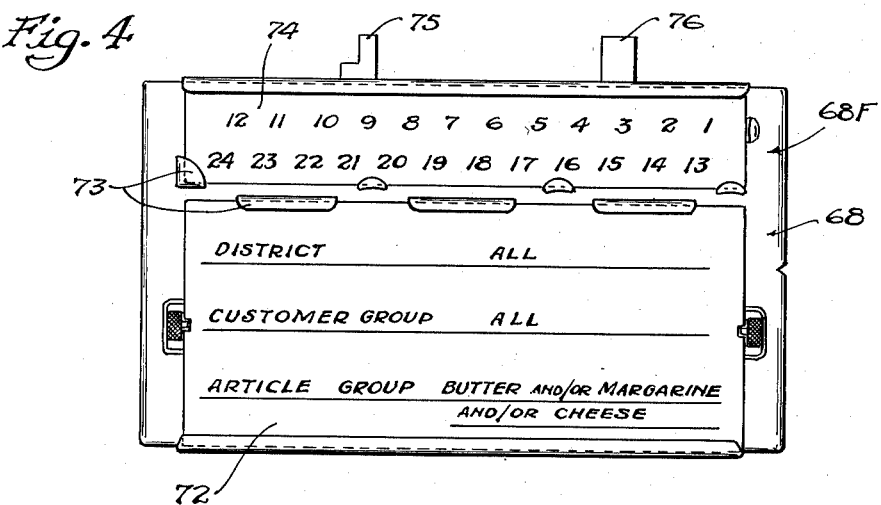
*Inventor*
*Carl R. Bernhag*
By *Wallace and Cannon*
*Attorneys*

Dec. 30, 1952     C. R. BERNHAG     2,623,453
TAB SENSING MEANS IN ADDRESS PRINTING MACHINES
Filed March 12, 1947     15 Sheets-Sheet 5
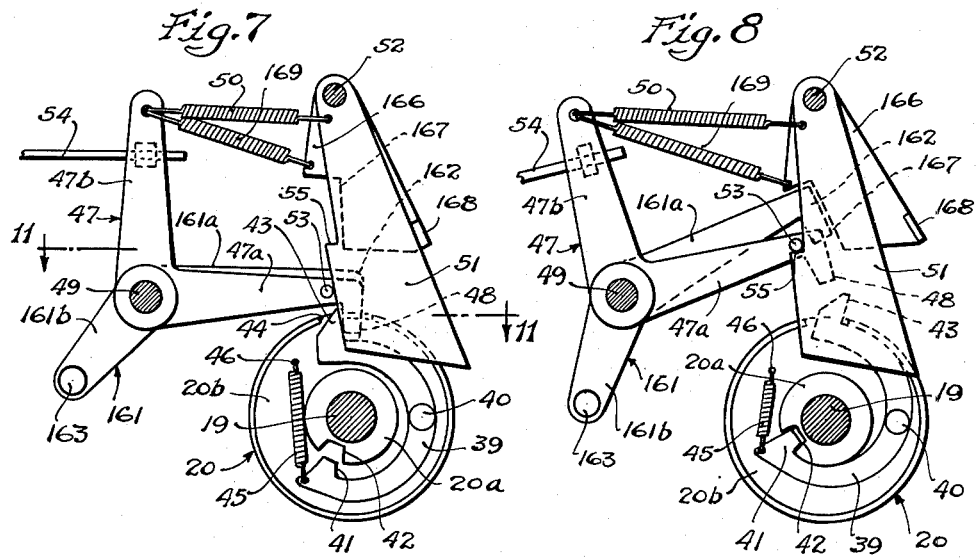
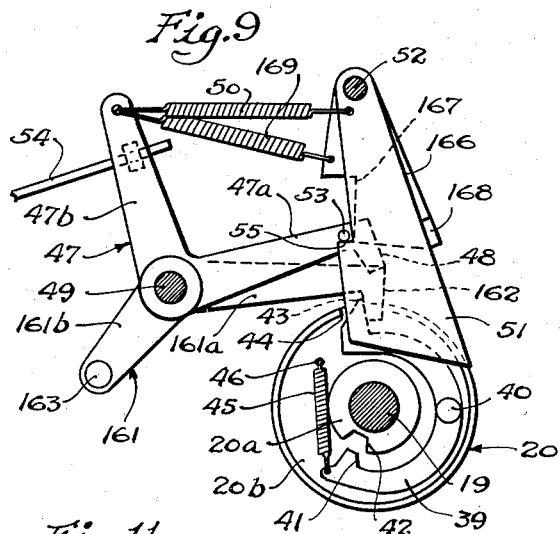
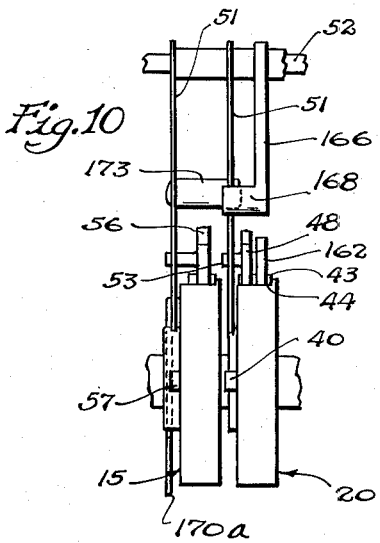
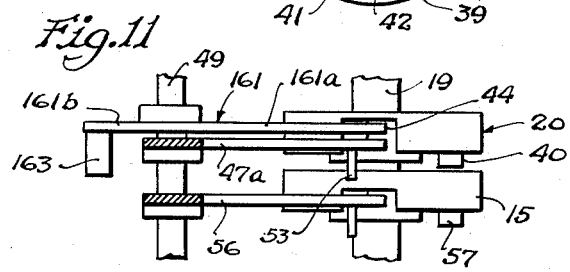
Inventor
Carl R. Bernhag
By Wallace and Cannon
Attorneys

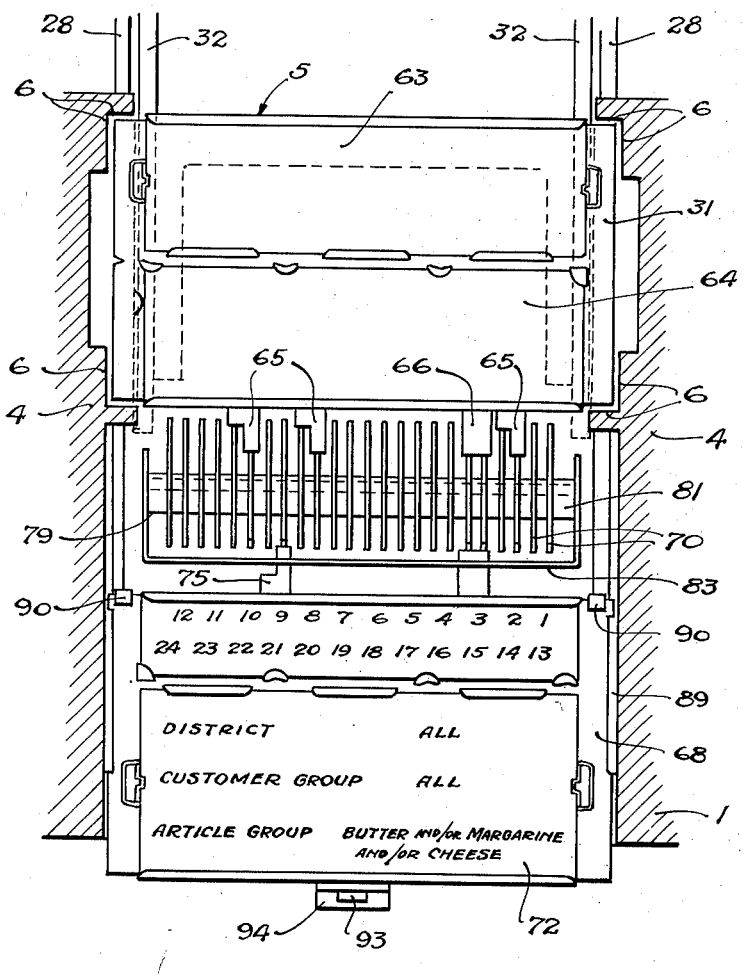

Dec. 30, 1952      C. R. BERNHAG      2,623,453
TAB SENSING MEANS IN ADDRESS PRINTING MACHINES
Filed March 12, 1947      15 Sheets-Sheet 7
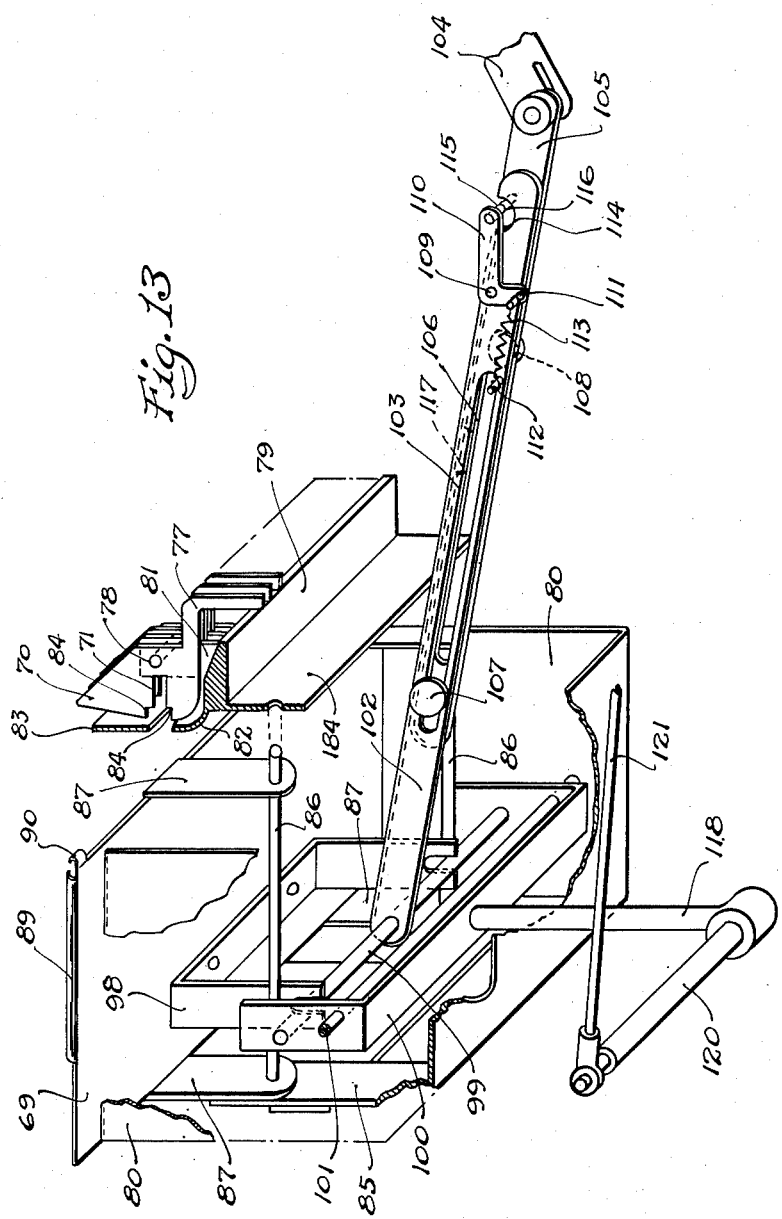
Inventor
Carl R. Bernhag
By Wallace and Cannon
Attorneys Dec. 30, 1952 C. R. BERNHAG 2,623,453
TAB SENSING MEANS IN ADDRESS PRINTING MACHINES
Filed March 12, 1947 15 Sheets-Sheet 8

Inventor
Carl R. Bernhag
By Wallace and Cannon
Attorneys

Dec. 30, 1952  C. R. BERNHAG  2,623,453
TAB SENSING MEANS IN ADDRESS PRINTING MACHINES
Filed March 12, 1947  15 Sheets-Sheet 10

Inventor
Carl R. Bernhag
By Wallace and Cannon
Attorneys

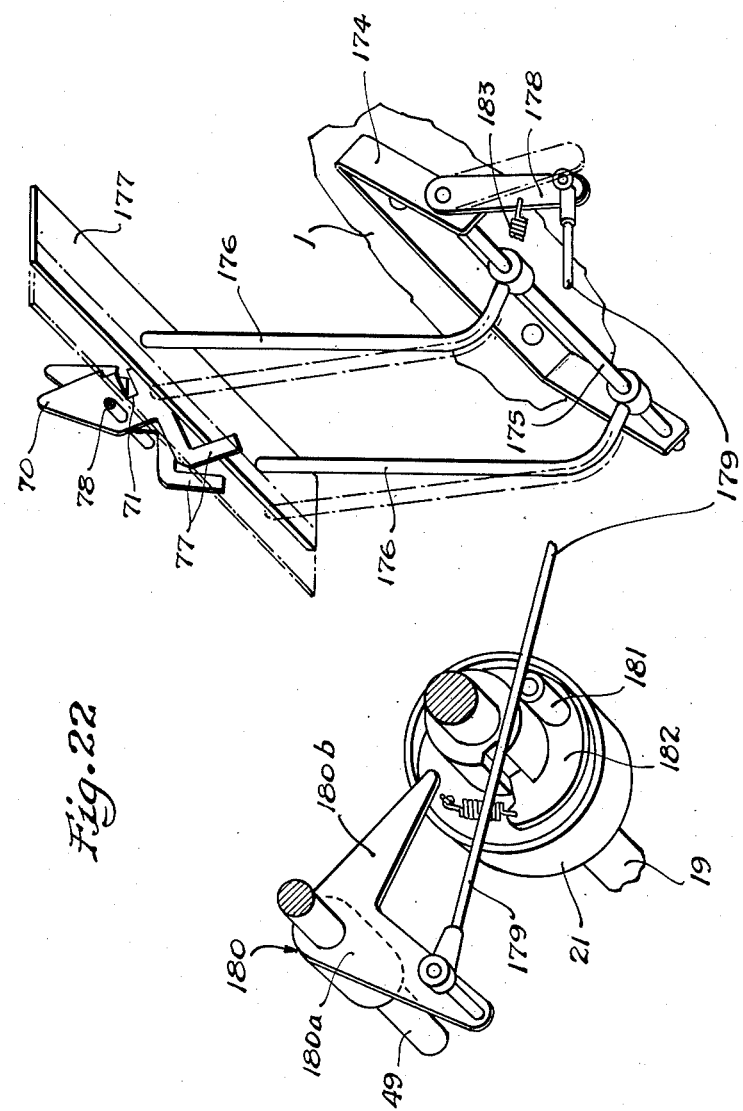

Dec. 30, 1952  C. R. BERNHAG  2,623,453
TAB SENSING MEANS IN ADDRESS PRINTING MACHINES
Filed March 12, 1947  15 Sheets-Sheet 14
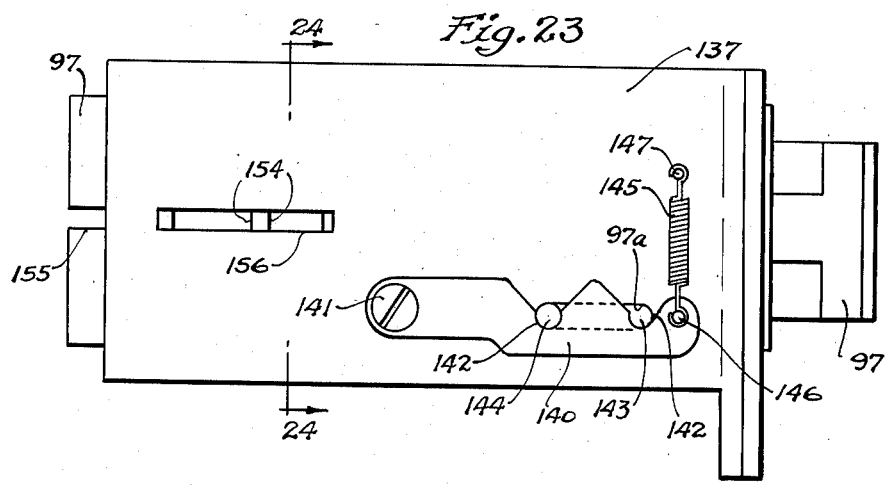
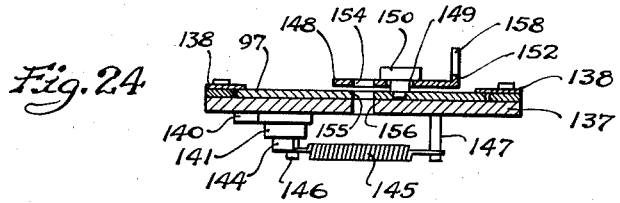
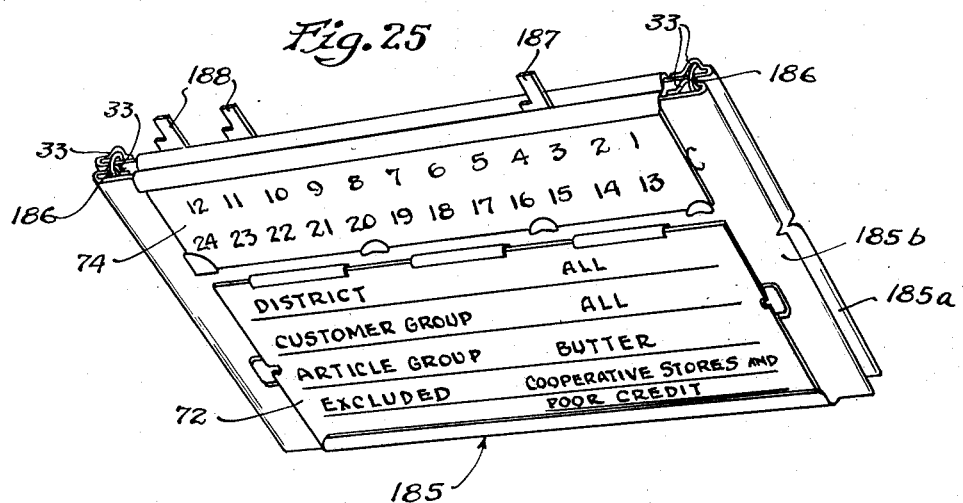
Inventor
Carl R. Bernhag
By Wallace and Cannon
Attorneys Dec. 30, 1952 C. R. BERNHAG 2,623,453
TAB SENSING MEANS IN ADDRESS PRINTING MACHINES
Filed March 12, 1947 15 Sheets-Sheet 15

Inventor
Carl R. Bernhag
By Wallau and Cannon
Attorneys

Patented Dec. 30, 1952

2,623,453

UNITED STATES PATENT OFFICE 2,623,453

TAB SENSING MEANS IN ADDRESS PRINTING MACHINES

Carl Richard Bernhag, Goteborg, Sweden, assignor to Addressograph-Multigraph Corporation, Wilmington, Del., a corporation of Delaware Application March 12, 1947, Serial No. 734,132
In Sweden March 19, 1946

16 Claims. (Cl. 101—56)

This invention relates to printing machines of a kind through which individual printing devices are passed one by one to a printing position in the machine, and particularly the invention relates to selector mechanism for such printing machines.

In printing machines of the character to which the present invention relates, the individual printing devices that are advanced one by one into the printing position in the machine usually bear identifying means at one or more of a plurality of identifying positions that are provided on each such printing device, and such identifying means have in the past been sensed to control a selector mechanism which in turn has governed one or more of the operative mechanisms of the machine. The most common use to which such selector mechanism has been applied has been the control of the printing operation of the machine, and in such use the selector mechanism is effective to suppress or enable the operation of the impression means of the machine in response to the sensed presence or absence of identifying means at selected and determined positions on the printing devices. The sensed indication that is attained with respect to each printing device becomes effective either in a succeeding cycle of machine operation, or through the intermediary of storage or delay means, becomes effective in some subsequent cycle of machine operation, and in the past the sensing operation has been performed at a suitable sensing station in the machine by moving the sensing means into sensing contact with a printing device resting in such station. While this arrangement has been found for many years to be quite satisfactory in most instances, situations are found where resort may not advantageously be had to this relationship. It is therefore an important object of the present invention to enable sensing of the identifying means on printing devices to be performed by moving the printing devices toward and into operative sensing contact with the elements of the sensing mechanism, and a related object is to enable this to be performed in such a way that the printing devices move into cooperative engagement with the elements of the sensing device as the printing devices move downwardly into the lowermost position into the supply magazine of the machine. Through such an arrangement, the sensing mechanism is located in a conveniently accessible position, usually near the rear edge of the frame of the printing machine.

In order that the selector mechanism of the aforesaid character may control operation of one or more operative devices in such machines in a predetermined manner under control of the presence or absence of identifying means on the printing devices at selected of predetermined positions on such devices, such mechanisms include a variable portion that may be set up in a selected or predetermined manner. When the variable portion of a selector mechanism is set up through the intermediary of a removable element, preformed to set up the mechanism in a predetermined manner, such element is usually referred to as being matrix and a selector mechanism so arranged is usually referred to as being a matrix selector.

A further object of the present invention is to afford a matrix selector wherein the matrix is disposed in a conveniently located position, and a related object is to enable the matrix in such a selector to be afforded by the use of printing devices of substantially the same character as the printing devices that are to be sensed by the selector mechanism.

Heretofore identifying means have been afforded on printing devices of the aforesaid nature by providing sockets at predetermined possitions along a margin of each such device and tabs have been removably secured in selected of such sockets in such a manner as to project beyond the aforesaid marginal edge of the device to thereby afford the identifying means thereon. Resort has also been had to notches formed at selected of predetermined positions along a marginal edge of each printing device and in other instances resort has been made to perforations formed at selected of predetermined positions on each printing device to thereby afford identifying means thereon. The sensing mechanisms of such selector mechanism are arranged to cooperate either with tabs, notches or perforations depending upon which type of identifying means are to be passed through the machine of which the selector mechanism is a part. Furthermore, the selector mechanism has been arranged so as to cause the operative mechanism or mechanisms under control thereof to operate in one sense or manner in response to the presence of identifying means at predetermined positions on the devices or to operate in such sense or manner in response to the absence of identifying means at such predetermined positions. Since tabs are the most commonly employed form of identifying means and since the printing or impression mechanism of the machines is the operative mechanism usually controlled by a selector mechanism it has been customary to refer to a selector as being arranged for print-tab operation when the selector is to cause the operative mechanism to function in response to the presence of tabs at predetermined positions, and to refer to the selector mechanism as being arranged for skip-tab operation when the selector mechanism is to cause the operative mechanism to function in response to the absence of tabs at predetermined positions.

A further and important object of the invention is to afford a matrix selector in which a plurality of matrices may be utilized so that one such matrix will control the machine in one sense while another matrix will control the mechanism in a reverse or opposite sense. Through such an arrangement, I have enabled one matrix to operate according to the print-tab system of control while another matrix operates according to the skip-tab system of control, and thus the usefulness of the selector mechanism has been materially increased.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 3 is an elevational view of a printing device of the kind employed in the machine in which this invention is embodied;

Fig. 4 is an elevational view of a control device or matrix of the nature employed in this invention;

Figs. 7, 8 and 9 are fragmentary side views of a clutch included in the machine in which this invention is embodied showing the operative parts of this clutch in different operative positions;

Fig. 10 is a fragmentary end view of the clutch illustrated in Figs. 7, 8 and 9;

Fig. 11 is a sectional view of the clutch shown in Figs. 7, 8, 9 and 10 and taken substantially on the line 11—11 in Fig. 7;

Fig. 12 is a plan view in which certain parts are broken away of the rear end of the guideway through which the printing devices are forwarded in the course of passage thereof through the machine;

Fig. 13 is a perspective detail view of a portion of the selector mechanism and the operating means therefor embodied in the apparatus of the present invention;

Fig. 22 is a fragmentary perspective view of the restoring mechanism and the drive therefor for the detecting members of the selector mechanism;

Fig. 23 is a bottom plan view of a portion of a reversing mechanism embodied in the selector mechanism;

Fig. 24 is a sectional detail view taken substantially on the line 24—24 in Fig. 23;

Fig. 25 is a perspective view of a modified form of the control device employed in the selector mechanism.

In the accompanying drawings, I have illustrated my invention as embodied in a printing machine of the character shown in Hueber Patent No. 2,070,549, patented February 3, 1937, to which patent reference may be made for details of construction of the machine.

As described in the aforesaid Hueber patent, individual printing devices are advanced one by one and in a step by step manner in a forward directon from the bottom of a supply magazine that is located near the back of the machine, and at a printing station disposed forwardly of the magazine, impressions may be made from the respective printing devices by the platen mechanism of the machine. The printing devices utilized in such machines are adapted to bear identifying devices such as tabs at one or more of a plurality of identifying positions afforded along what may be termed the rear edges of such printing devices, and for automatically controlling the print-skip operation of the machine, the present invention provides selector means wherein detecting elements are set or rendered effective by movement of the printing devices downwardly into operative setting engagement with such detecting elements. This advantageous characteristic of the present mechanism enables the sensing operations to be performed while the printing devices are in position in the supply magazine, and in addition enables replaceable governing matrices for such selecting means to be disposed in a conveniently accessible position at the back of the machine.

Figure 1:
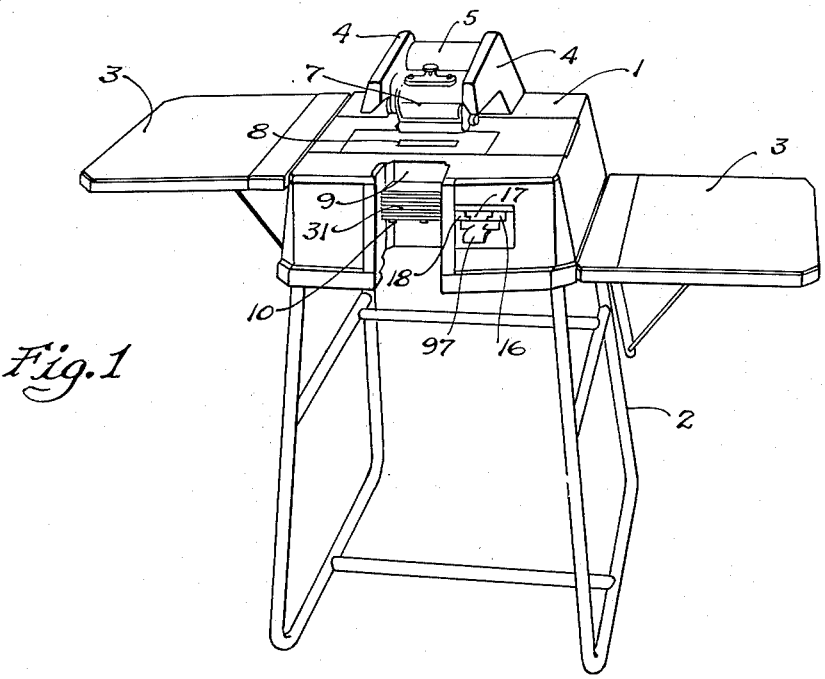
Fig. 1 is a perspective view of a printing machine of the nature in which my invention may be embodied.

The machine as herein illustrated includes a frame 1 preferably in the form of a casting embodying a relatively flat portion affording a table top and from which depend side and front and rear walls, shelves as 3 being attached to the side walls in a manner shown in Fig. 1, and desirably the frame 1 is supported on a stand as 2. A pair of laterally spaced arms 4 extend upwardly from the rear end of the frame 1 as it is viewed in Figs. 1 and 2 to support a platen mechanism that is desirably of the character shown in Hueber Patent No. 2,104,863, patented January 11, 1938.

Figure 2:
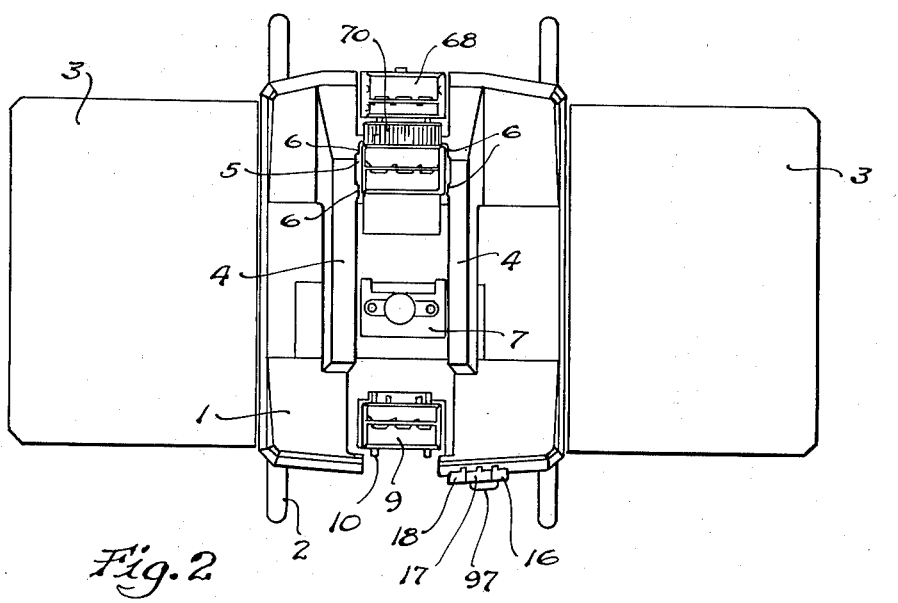
Fig. 2 is a top plan view of the machine illustrated in Fig. 1.

As best shown in Fig. 2 a supply magazine 5 composed of vertically extended side frame members 6 is disposed near the rear edge of the machine between the arms 4 adjacent the connection thereof to the frame 1. Printing devices as 31, Fig. 3, stacked one upon the other are introduced into the magazine 5 from the top thereof so as to be stacked in the magazine 5 in such a way that the lowermost printing device in the magazine may be withdrawn therefrom to be fed forwardly through a guideway for such printing devices afforded in the printing machine to thereby be advanced to printing position in the machine above a suitable anvil (not shown) located below the opening 8 in the frame 1 to thereby be disposed in printing position in the machine. An impression is made from the printing device at 31 supported on the aforesaid anvil in alignment with the opening 8 by a platen roller 7 as described in detail in the above referred to Hueber Patent No. 2,104,863.

Figure 5:
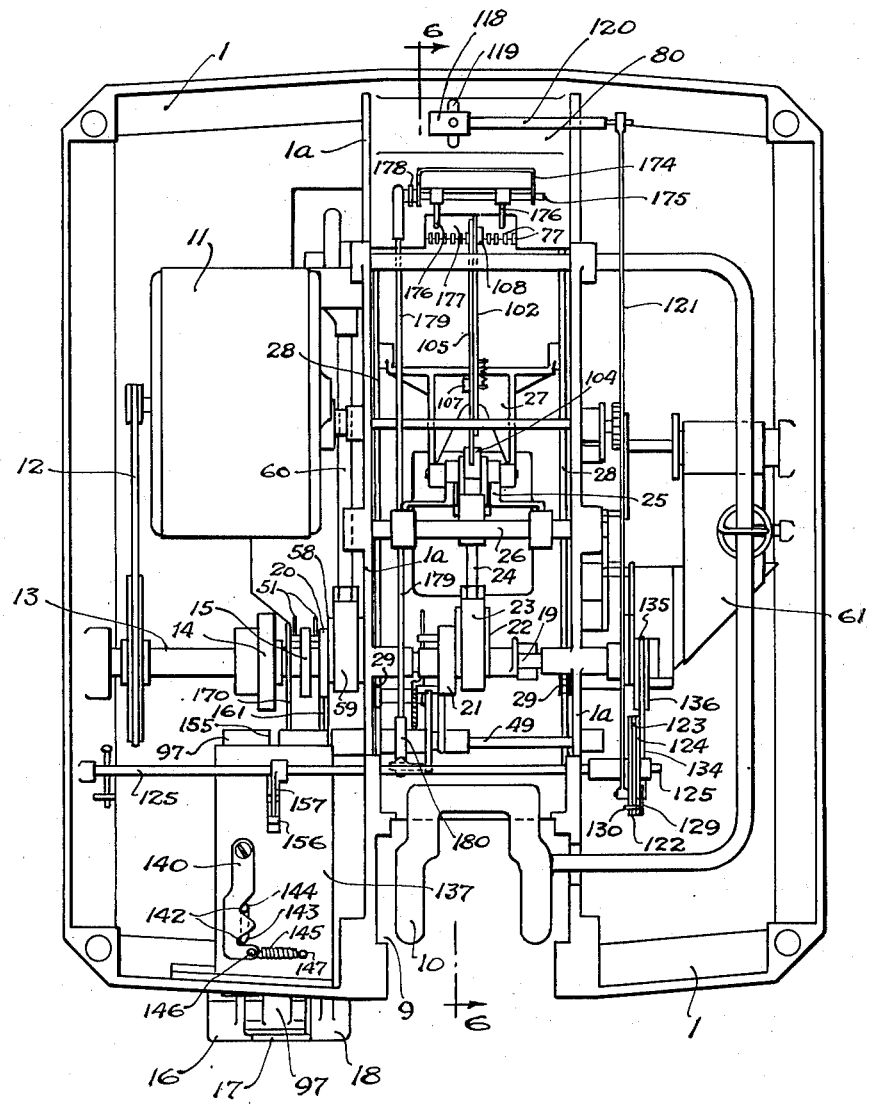
Fig. 5 is a bottom plan view of the machine as illustrated in Fig. 2.

The machine is driven by an electric motor 11, Fig. 5, carried by the frame 1 beneath the table top of the frame 1, an endless belt 12 being passed about a pulley fast on the shaft of the motor 11 and another pulley fast on a shaft 13 journalled in suitable bearings carried by the frame 1. The main drive shaft 19 of the machine is journalled in suitable bearings carried by the frame 1 and is disposed in endwise alignment with the shaft 13 and is connected thereto by means including a friction slip clutch 14. The slip clutch 14 is of such a nature that if any part of the mechanism driven from the main drive shaft 19 should be held against operation in the intended manner, the clutch 14 will permit the shaft 13 to rotate without rotating the main drive shaft 19 so as to thereby prevent injury to operative mechanisms in the machine.

The main drive shaft 19 is connected to the driven element of the friction slip clutch 14 through a master clutch 15, which is desirably of the one-revolution type and which is engaged when the operative parts of the machine are to be caused to function. Moreover, in order that either the means for advancing the printing device through the machine or means for operating the platen may be operated independently of each other, two additional one-revolution clutches, respectively designated 20 and 21, are provided on the main drive shaft 19 and these clutches are arranged so that one or the other of these clutches, or both, may be engaged concurrently with the engagement of the main clutch 15. In the present instance, engagement of the clutches 15, 20 and 21 is effected under control of three control keys 16, 17 and 18 which project forwardly through the main frame of the machine as shown in Figs. 1 and 2. The particular manner in which these keys are operated to bring about functioning of the operative parts of the machine will be described in detail hereinafter.

Figure 6:
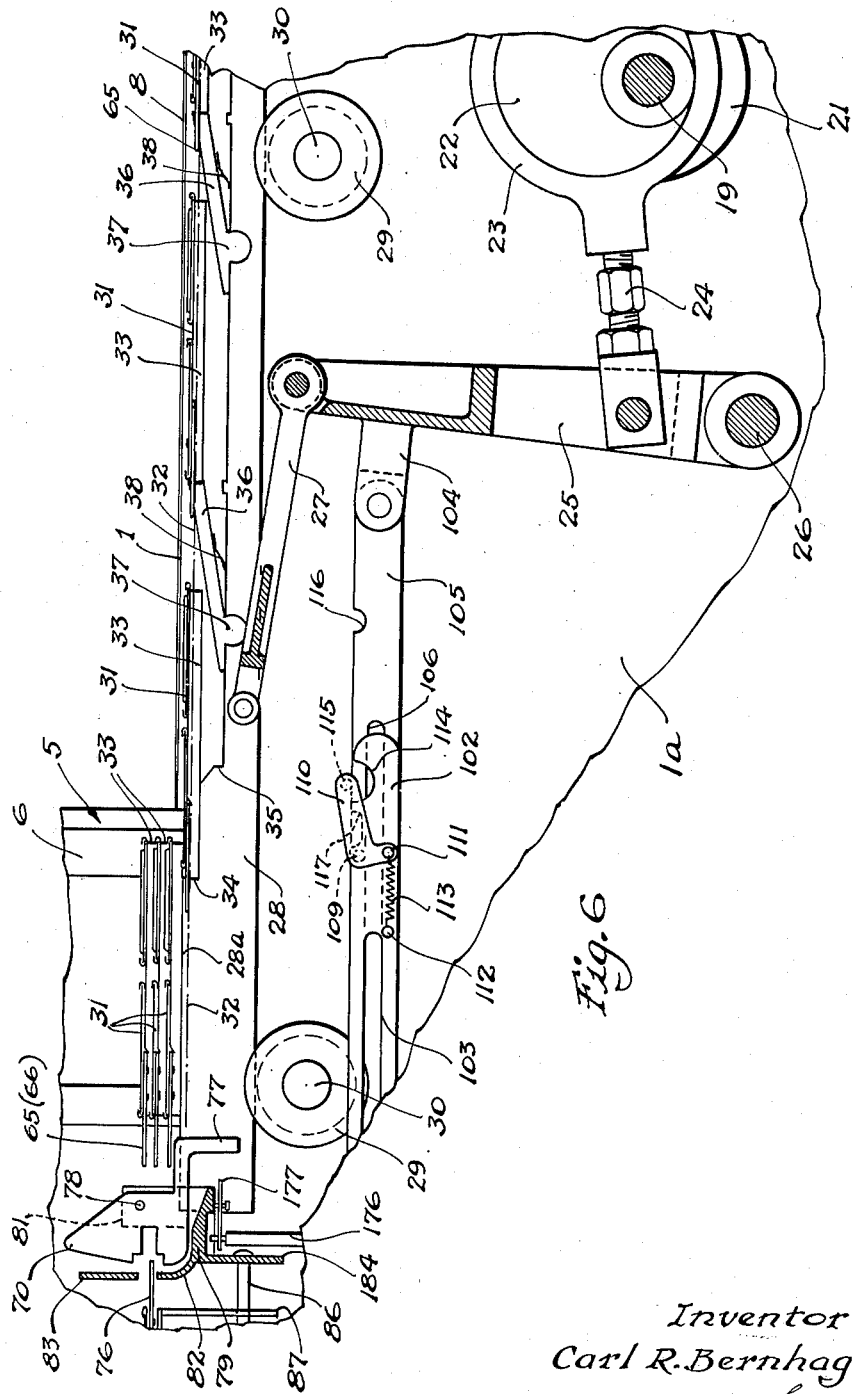
Fig. 6 is a fragmentary longitudinal sectional view toward the printing device guideway and taken substantially along the line 6—6 in Fig. 5.

The magazine 5 into which the printing devices are introduced when these are to be fed into the machine is disposed at the rear end of a printing device guideway that is located between the plates 1a, Fig. 5, provided in the main frame 1 substantially midway between the side walls of the frame and in spaced-apart relation one with the other. The lowermost printing device in the magazine 5 is withdrawn therefrom by carrier bars as 28, Fig. 6, that are mounted on the inner faces of the plates 1a and which are supported and guided for reciprocation over these faces by flanged rollers as 29 mounted on studs 30 fast in the side plates as 1a. A reciprocatory movement is imparted in the carrier bars as 28 from the main drive shaft as 19 through the feed clutch 21 when the same is engaged, this being effected in a normal operation of the machine by depressing the control key 18. The clutch 21 has the driven element thereof connected to an eccentric 22 that is rotatably mounted on the main drive shaft 19, and a circular band 23 surrounding this eccentric 22 has a connecting rod 24 extended therefrom and pivotally connected to a rocker 25 pivotally mounted on a shaft 26 carried by the plates 1a. A link 27 has one end thereof pivotally connected to the free end of the rocker 25 and the other end of this link is pivotally connected to the carrier bars as 28 as shown in Fig. 6. In the initial or at rest position of the carrier bars 28 the shoulders as 34 thereon are disposed behind the lefthand edge of the lowermost printing device as 31 in the magazine 5 (the shoulder 34 being shown in an intermediate position in the operation thereof in Fig. 6 and when the clutch 21 is initially engaged the rocker 25 is caused to pivot clockwise as viewed in Fig. 6 and thereupon the shoulders as 34 on the carrier bars as 28 move forwardly and engage the rear edge of the lowermost printing device in the magazine 5 which at that time is resting upon guides as 32 formed on the plates as 1a in alignment with the magazine 5. As the carrier bars as 28 move forwardly from the aforesaid at rest position thereof toward and beyond the position thereof shown in Fig. 6, the edges 28a thereof disposed rearwardly of the shoulders as 34 thereof move forwardly beneath the next lowermost printing device remaining in the magazine and prevent the same from passing down onto the guides as 32 until such time as the carrier bars 28 are returned to their rear or at rest positions. Forwardly of the shoulders as 34 the upper edges of the carrier bars as 28 are recessed as indicated at 35 and sets of pawls as 36 are pivotally mounted in these recessed portions 35 by having rounded portions as 37 thereon disposed in complementally shaped recesses formed in the carrier bars, said pawls being urged upwardly toward their effective positions by springs as 38.

At the time the rocker 25 attains the end of its movement in a clockwise direction as viewed in Fig. 6, what has been the lowermost printing device in the magazine 5 will have been advanced from the magazine 5 to a position intermediate the magazine 5 and the aforesaid printing station in the machine in alignment with the opening 8 and the magazine. Immediately after the rocker 25 attains the end of its movement in a clockwise direction as viewed in Fig. 6, the rocker 25 starts movement in a counterclockwise direction and in the course of this movement the shoulder 34 passes back beneath the lowermost printing device in the magazine, and at this time the first set of pawls as 36 immediately forward of the shoulder 34 pass beneath the printing device that has been moved into the aforesaid intermediate position, in which position in the guideway the printing device is frictionally retained. In the course of the next operation of the carrier bars 28 and upon movement of the rocker 25 in a clockwise direction, as viewed in Fig. 6, the aforesaid first set of pawls engage the printing device in the aforesaid intermediate position and carry this printing device forward to printing position in alignment with the opening 8. During this operation of the carrier bars 28, the lowermost printing device now in the magazine is advanced into the aforesaid intermediate position. In the operation of the carrier bars subsequent to that last referred to, the second set of pawls as 36 that are forwardly of the aforesaid first set of pawls as 36 engage the printing device that has been in printing position and move this printing device from this position, while the aforesaid first set of pawls as 36 move the printing device that has been in the aforesaid intermediate position into printing position, and at this same time the shoulders as 34 advance yet another printing device from the magazine into the aforesaid intermediate position. The printing device that is advanced from printing position in the last described operation of the carrier bars comes to rest in a position forwardly of printing position from which it is discharged into a printing device receiving hopper 9, Figs. 2 and 5, provided at the forward end of the guideway through which the printing devices are advanced, such printing devices being discharged into this hopper by a set of pawls as 36 (not shown in Fig. 6). The printing devices discharged into the receiving hopper 9 are supported by the support arms as 10, Fig. 5, as described in aforesaid Patent No. 2,070,549, are resiliently supported into position so as to move downwardly as printing devices pass into the receiving hopper 9. When the several printing devices have been collected in the receiving hopper 9 they may be manually removed therefrom in the manner well understood in the art.

The platen mechanism which is reciprocated between the arms 4 includes a platen roller 7 that is caused to move downwardly toward and upwardly away from a printing device disposed in alignment with the opening 8, and in the course of a cycle of operation thereof and during the time the platen roller 7 is in the lower position thereof, and rolling across the printing device at printing position 8, an impression is made onto a sheet disposed between the platen roller and the printing device, an inking ribbon usually being disposed over the type characters provided on the printing device and beneath the aforesaid sheet, such inking ribbon and the means for advancing the same being described in above referred to Patent No. 2,070,549.

In the present instance the platen roller 7 is operated in making an impression in the aforesaid manner by means including a platen clutch 20 which, as shown, for example in Fig. 7, includes a driving collar 20a fast to the main drive shaft 19 and a substantially cup-shaped driven element 20b that is rotatably mounted on the shaft 19. A pawl 39 is pivotally mounted on the plate portion of the cup-shaped element 20b intermediate the flange of the element 20b and the collar 20a and includes an inwardly projecting nose 41 that is adapted to seat in a notch 42 formed in the collar 20a when the clutch 20 is to be engaged, the nose 41 being urged toward the collar 20a by a spring 45 extended between the end of the pawl 39 near the nose 41 and a spring anchor 46 mounted on the plate portion of the element 20b. A lug 43 is provided on the pawl 39 at the end thereof opposite the nose 41 and this lug projects through an opening 44 in the flange of the cup-shaped element 20b, the spring 45 normally being effective to urge the lug 43 through this opening.

A shaft 49, Fig. 5, is journalled in the plates 1a adjacent to the main drive shaft 19 and a main stop lever for the platen clutch 20 is afforded in the form of a bell crank lever generally indicated by 47, Fig. 7, that is pivotally mounted on the shaft 49 in a position to have the arm 47a thereof aligned with the flange portion of the cup-shaped element 20b. Thus the latch element 48 at the free end of the arm 47a may engage the lug 43 on the pawl 39 to disengage the clutch, and may pass into the opening 44 to hold the driven member 20b in the predetermined rotative position while the clutch is disengaged. The parts are shown in this position in Fig. 7. The latch 48 is urged into the aforesaid position under the influence of a spring 50 extended between the arm 47b of the stop lever 47 and a latch element 51 that is pivotally mounted on a rod 52 carried by the plates 1a. The control key 18 is connected to one arm of a bell crank lever (not shown) and the other end of this bell crank lever has one end of a rod 54 connected thereto, the opposite end of this rod being suitably connected to the arm 47b of the bell crank lever 47. This arrangement is such that when the key 18 is depressed, movement is transmitted through the rod 54 to rock the arm 47b of the bell crank 47 counterclockwise as viewed in Fig. 7 whereupon the latch element 48 is withdrawn from engagement with the lug 43, and when this occurs the pawl 39 is normally released to the action of the spring 45 to thereupon move the nose 41 into the recess 42, and this connects the driven element 20b of the platen clutch 20 to the driving element 20a so that the element 20b of the clutch rotates with the shaft 19. In the course of such rotation the lug 43 is disposed so as to project outwardly a substantial distance through the opening 44 in the flange of the cup-shaped element 20b, and hence the lug 43 is in position for engagement with the latch 48 of the stop lever 47a in the event that the lever 47a is in its operative position, and when this occurs the clutch pawl 39 is rocked to the position of Fig. 7, thereby to withdraw the nose 41 from the notch 42, and in this way rotation of the element 20b of the platen clutch 20 with the shaft 19 is interrupted at the end of a single rotation of the shaft 19.

The latch 51 that has been mentioned hereinbefore is effective during a portion of the one-revolution cycle of the platen clutch 20 to hold the stop lever 47a in its retracted or ineffective position as shown in Fig. 9 of the drawings, and for this purpose, a shoulder 55 is formed on the left hand edge of the latch 51 as viewed in Fig. 7. When the stop lever 47a is in its effective position of Fig. 7, the left-hand edge of the latch 51 as viewed in Fig. 7 is held against a pin 53 carried on the stop lever 47a. When the stop lever 47a is retracted to its ineffective position, the latch 51 is first rocked in a counterclockwise direction, Fig. 7, and the shoulder 55 then moves beneath the pin 53 as shown in Fig. 9, thereby to hold the stop lever 47a in its ineffective position until the latch 51 is released. Such releasing of the latch 51 takes place after the platen clutch 20 has progressed through substantially three quarters of its one-revolution cycle, and at this time the projecting pivot pin 40 on the driven member of the clutch engages the left-hand edge of the latch 51 so as to rock the same for a substantial distance in a counterclockwise direction, thereby to release the pin 53 from the shoulder 55 and allow the stop lever 47a to return to its effective position, and as a result, the stop lever 47a is effective upon the lug 43 of the clutch pawl 39 to disengage the clutch at the end of the one-revolution cycle.

The main clutch 15 of the machine is disengaged at the same time and in a corresponding manner by the stop lever thereof, it being noted that the main clutch 15 has a latch 51 corresponding to the latch 51 which is disengaged by the action of a pivot pin 57, Fig. 11, that corresponds in form and function with the pivot pin 40. The feed clutch 21 that operates the printing device advancing means is similarly constructed and controlled, and it will be noted that the latches 51 for the platen clutch 20 and the master clutch 15 have for purposes of clarity of disclosure been omitted in Fig. 11 of the drawings.

When the driven member 20b of the platen clutch is operated through its one-revolution cycle, an eccentric 58, Fig. 5, that is fixed to the driven member 20b is correspondingly rotated, and this eccentric is connected by means including a strap 59 and a connecting rod 60 with the platen mechanism. By means of a link system such as that illustrated in the aforesaid Hueber Patent No. 2,070,549, the connecting rod 60 is effective to operate the platen roller 7 in such a way that the roller is moved forwardly and downwardly with respect to the opening 8 in the table top so as to press a sheet or the like against an inked ribbon 61 that is disposed across the opening 8 and over a printing plate 31 disposed in printing position beneath the opening 8. The operation of the platen drive mechanism is such that the platen roller 7 is then moved with a rolling action in a rearward direction so as to form a printed impression from the plate 31 onto the lower face of the sheet, and at the end of such printing stroke, the platen roller is withdrawn in an upward direction as described in the aforesaid Hueber Patent No. 2,070,549.

The control key 16, Fig. 1, may be termed the skip control key in that it causes engagement of the feed clutch 21 so as to thereby cause the printing device advancing means to be operated while the platen mechanism remains at rest. Similarly, the key 18 constitutes a duplicate control key in that operation of this key alone causes engagement of the platen clutch 20 so that the platen mechanism is operated while the printing device advancing means remains at rest. When the machine is to be operated in what is usually termed consecutive printing operations, the two control keys 16 and 18 must be operated simultaneously and the control key 17 is effective in the present instance as a consecutive control key. Thus as will be evident in Figs. 1, 2 and 5, the consecutive key 17 is disposed between the skip control key 16 and the duplicate control key 18, and lateral projections are afforded on the key 17 which overlie the keys 16 and 18 respectively. Thus when the consecutive key 17 is actuated, the platen mechanism and the printing device advancing mechanism will normally be rendered operative in the machine cycle, and it might be noted in this regard that the key 17 does not have direct controlling connections with the clutches 15, 20 and 21, but attains this controlling action through simultaneous actuation of the keys 16 and 18.

As will be evident in the aforesaid Hueber Patent No. 2,070,549, the timing of the machine is such that the carrier bars 18 move through their forward or advancing strokes during the first half of the machine cycle, and at this same time the platen roller 7 is being moved forwardly and downwardly through a conditioning stroke. The carrier bars 28 thus move through their return strokes during the last half of the machine cycle, and it is during this period that the printing devices 31 in the printing device guideway are stationary and the platen roller 7 moves rearwardly through its operative printing stroke.

The printing devices that are utilized in the machine of the present invention may be of many different kinds, but as herein shown in Fig. 3 of the drawings, such printing devices have a frame 31f formed from sheet metal having fastening or securing means 62 thereon whereby an embossed printing plate 63 may be removably secured on the forward face of the frame 31 and adjacent to the lower edge thereof. Securing devices 62 are also afforded on the frame 31f whereby an index card 62 may be secured on the forward face of the frame adjacent the upper edge thereof, and the securing devices that are thus employed may be of the character illustrated in the Gollwitzer Patent No. 2,132,412, patented October 11, 1938, with the exception however that securing devices in the present instance are arranged to accommodate a one-piece card 64 rather than a sectional index card as shown in the aforesaid Gollwitzer patent.

The printing device 31 is adapted to receive identifying means such as tabs 65 or 66 along the upper edge thereof in any one or more of a plurality of identifying positions, and these identifying positions are afforded and defined by a plurality of tab sockets 67 of which twelve are provided in the present instance. The tabs 65 as shown in Fig. 3 are what are known as notched tabs so that each socket 67 may have a tab therein disposed in either one of two positions, and thus twenty-four identifying positions are afforded on the printing device. The plain or unnotched tab 66 is used where identifying means are to be afforded in both of the positions that are defined by a single tab socket 67.

For purposes of disclosure, the indicating positions on the printing devices 31 are numbered from left to right when viewed from the front face of the printing device. Thus with respect to each tab socket 67, the left-hand indicating positions of the several sockets are numbered from 1 to 12 and in a left to right direction as viewed in Fig. 3, while the right-hand indicating positions for the respective sockets 67 are numbered from 13 to 24 inclusive and in a left to right direction as viewed in Fig. 3. Different numbering systems may of course be employed.

With the twelve tab sockets that are thus afforded, the printing device 31 has twenty-four possible indicating positions and these indicating or identifying positions may be allocated to different items or characteristics of a classification system that may be used by the owner of the machine. As an example, the machine may be owned by a wholesale food merchant and the printing devices may, by a system of classification or tabbing, be arranged to embody selection data whereby the owner may operate the printing machine so as to print addresses on envelopes or the like for customers of any selected class or sales district.

As a further example, the tabs as shown on the printing device 31 of Fig. 3 may be assumed to represent data pertaining to the customer of a wholesale grocer. Thus the single tab in the most left-hand position, which is No. 2 position, may be assumed to indicate that the customer resides in the second sales district. Moreover, the double tab 66 may be taken to indicate that customer is a purchaser of butter and that the customer is also a purchaser of margarine. The single tab 65 in position 8 of the printing device 31 may be taken to indicate that the customer is a grocer, while the single or notched tab 65 disposed in position No. 10 may indicate that the customer is a member of a cooperative buying group. The foregoing represents an assumed system but is representative of situations that might arise in any of the known systems of classification that are used for selection purposes in printing machines of the general character to which this invention relates.

When a supply of printing devices 31 is introduced into the magazine of the machine, selector means are effective to sense the tabs of the printing devices successively so as to govern the printing mechanism when the respective printing devices reach printing position, and under the present invention the selector means are in the nature of a matrix selector that uses a replaceable matrix 68 that is illustrated in Fig. 4 of the drawings. Under the present invention the matrix 68 is afforded through the use of a printing device frame 68f that is similar in most of its characteristics to the printing device 31. The matrix 68 has the desired selecting characteristics imparted thereto through the use of tabs that are mounted in the tab sockets of the printing device frame 68f in substantially the same manner as the index tabs 65 and 66 which are mounted on the frame 31f of each printing device.

The matrix selector of the present invention is arranged so that the sensing operation with respect to the printing devices is performed upon or with respect to the lowermost printing device in the supply magazine, and to enable this to be accomplished in such a manner that the matrix 68 may readily be removed and replaced, the matrix 68 is operatively mounted upon a sensing head in the form of a slide 69, Fig. 13 which is disposed in an accessible position along the rear side of the machine and somewhat rearwardly of the supply magazine 5. As will hereinafter be pointed out in detail, the sensing slide 69 is moved yieldingly in a forward direction in each normal machine cycle just prior to the withdrawal of the lowermost printing device 31 from the magazine, and in such forward sensing movement of the sensing slide 69, the desired sensing operation is performed and control means are rendered effective through suitable storage or delay means whereby the operation of the platen mechanism 7 is controlled when this printing device reaches printing station. Such sensing of the lowermost printing device is accomplished through the intermediate agency of a plurality of detecting elements 70, Figs. 6, 12, 13, 15, 16 and 17, that are disposed beneath the supply magazine 5 for cooperation not only with the tabs carried by the lowermost printing device 31, but also for cooperation with the tabs carried by the matrix 68 as will hereinafter be described.

The detecting elements 70 are mounted for rocking movement on a transverse horizontal shaft 78 that extends between the plates 1a of the frame, and twenty-four such detecting elements 70 are afforded in spaced positions along the shaft 78 so as to adapt the forwardly projecting ends 77 of the detecting elements for engagement respectively by tabs in the related positions of the lowermost printing device 31 in the supply magazine. The rearward ends of the detecting elements 70 are relatively large or plate-like in form, and in the rear edges of these head, the detecting elements have rearwardly opening slots 71 which in the normal positions of the detecting elements are aligned with the tabs that are carried on the matrix 68. In the forward sensing movement of the sensing slide 69, any such tabs carried on the matrix 68 may thus normally enter into the slots 71, but in the event that the presence of a tab on the lowermost printing device 31 in the supply magazine has rocked a detecting element 70 from the normal position of Fig. 16 to the set position of Fig. 17, then a tab 75 disposed in an opposing or corresponding position on the matrix 68 will engage a lower shoulder 84 that is formed at the rear end of the notch 71 so as to thereby stop the movement of the sensing slide 69 as will be evident in Fig. 17. It will be observed that an upper shoulder 84 is formed at the mouth of the slot 71 so as to function in certain sensing operations under the present invention as will hereinafter be described in detail.

It will be evident that in the event that none of the detecting elements 70 in positions corresponding to the tabs 75 on the matrix 68 have been actuated or set, the forward sensing movement of the sensing slide 69 may progress throughout its full range so that all of the tabs of the matrix 68 will assume the relationship shown in Fig. 16 wherein they project into the aligned notches 71, and in such an instance, a different controlling action is attained as will hereinafter be described. The completion of the full sensing stroke of the sensing slide 69 to the relationship shown in Fig. 16 may thus be made effective as will hereinafter be described to cause the related printing device 31 to be either printed or skipped. Thus when a printing device 31 bears a tab in a position corresponding with the position of a tab on the matrix 68, the stopping of the sensing stroke of the sensing slide 69 in the relationship indicated in Fig. 17 may be rendered effective to cause skipping of the related printing device when this printing device reaches printing position, and this has usually been termed skip-tab operation of the machine. However, as will hereinafter be described, this action may be reversed by the operation of a reversing slide 97, Figs. 1 and 23, so that the machine will operate according to a print-tab cycle in which only those printing devices will be printed which have a tab in a position corresponding to the tab on the matrix 68.

In attaining such controlling action in the present machine, provision is made for storing or delaying the action of the sensing slide 69 while the related printing device is in the intermediate station along the printing device guideway, but it will be recognized that such storage or delay mechanism may be eliminated in those instances where a printing device is moved directly from position in which it is sensed and into the printing station.

The matrix 68 is, as hereinbefore pointed out, afforded by a printing device frame 68F that is generally similar to the frame 31F, with the exception however that differently located retaining means 73 are afforded whereby a relatively large lower index card 72 may be disposed in the position normally occupied by the printing plate, while a relatively narrow upper index card 74 may be disposed in the area adjacent the upper edge of the frame 68F. The upper index card 74 is utilized in the present instance to carry a plurality of position-indicating numbers for indicating the positions in which tabs 75 or 76 are to be disposed on the frame 68F. The frame 68F of course has twelve tab sockets such as the sockets 67, but since the matrix 68 is to be mounted on the slide 69 in a reverse relationship with respect to the printing devices in the supply magazine, the location of the numbers on the index card 74 is reversed. The index card 72 is utilized to carry written or printed data showing the selection characteristics for which the particular matrix has been adapted. Thus, the user of the machine may maintain a file of the matrix selector devices 69 and may choose any such matrix from a file thereof merely by looking at the data written or printed on the index card 72. The matrix 68 that has been illustrated in Fig. 4 of the drawings has been afforded by a full tab 76 that occupies positions 3 and 15, and this may be taken to indicate that this matrix is to select printing devices having tabs in positions 3 and 15 which respectively indicate purchasers of butter and margarine, while a notched tab 75 in position 9 will render this matrix effective to select printing devices that have been tabbed to indicate that such printing devices relate to purchasers of cheese. Other tabs could of course be provided on the matrix 78 to make selections according to sales district or according to other data such as the credit rating of the persons or companies to whom the printing devices pertain.

Figure 14:
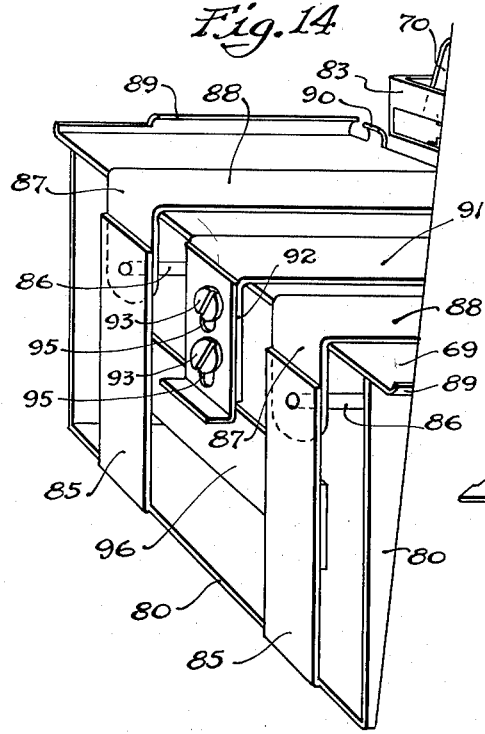
Fig. 14 is a fragmentary perspective view looking in at the rear end of a portion of the apparatus illustrated in Fig. 13.
Figure 15:
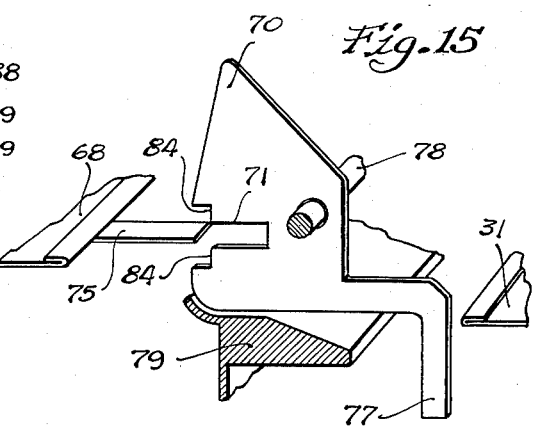
Figs. 15, 16 and 17 are fragmentary perspective detail views of the detecting members and related apparatus of the selector mechanism in this invention and wherein the functioning parts are shown in different operative positions.

The detecting elements 70 has hereinbefore pointed out, are mounted on a transverse pivot shaft 78, and the rear or head portions of these detecting elements 70 are relatively heavy so that the detecting elements are normally moved by gravity to the positions shown in Figs. 14 and 15 wherein the lower edges of the head portions of the detecting elements rest upon a locating bar 79 that is carried between the side walls of a frame 80, Fig. 13, which serves to support the sensing slide 69 as will be hereinafter described in further detail. The supporting bar 79 is formed with upwardly extending spacing lugs 81, Fig. 13, that project between the detecting elements 70 so as to hold these elements in properly spaced relation along the shaft 78. The supporting bar 79 also has an upwardly extending flange 82 that is disposed just rearwardly of the rear of the detecting elements 70 and which terminates in an upper edge that is disposed just below the normal location of the lower edges of the lower shoulders 84 of these detecting elements. Somewhat above the flange 82, a protecting plate 83 is mounted between the sides of the frame 80 so that an opening or slot is afforded between the flange 82 and the plate 83 which is of such a width as to expose both the upper and lower shoulders 84 so that tabs may move horizontally through such slot and into cooperation with either of these shoulders depending upon the vertical position of such tabs. Thus in a sensing movement of the sensing slide 69, any tabs that may be carried on a matrix 68 on the slide 69 may move through the clearance slot that is afforded between the flange 82 and the plate 83 and may move either into abutment with one of the lower shoulders 84 or into an aligned slot 71, depending upon the positioning or setting of the detecting elements 70.

Figure 16:
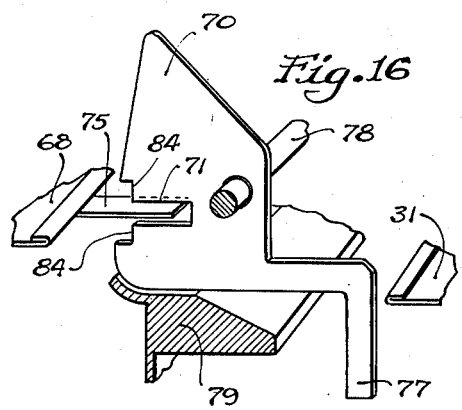
Figure 17:
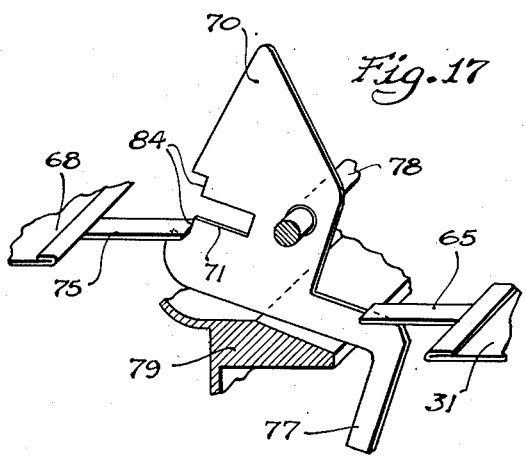

In the normal position of the detecting elements 70, a tab on the matrix 68 may of course move into the slot 71 as shown in Fig. 16 of the drawings, but in the event that a tab on the lowermost printing device 31 in the magazine has rocked or set a detecting element 70 to the set position of Fig. 17, any tab on the matrix 68 and opposite such a set detecting element will engage the lowermost shoulder 84 of this detecting element and will thus terminate the sensing movement of the sensing slide 69.

The sensing slide 69 is best shown in Figs. 6, 12, 13 and 14, and is mounted in the generally U-shaped frame 80 just rearwardly and somewhat below the level of the lower end of the supply magazine. Thus along the rear edge of the frame 80, a pair of spaced upwardly extending arms 85 are afforded and slide bars 86 have the rear ends thereof mounted in the arms 85, the forward ends of the slide rods 86 being carried in a downwardly projecting flange 184 of the supporting bar 79. The sensing slide 69 is slidably mounted on the rods 86, and for this purpose two pairs of downwardly projecting arms or lugs 87 are afforded respectively on the front and rear edges of the selector slide 69, and these lugs 87 have bearing openings therein through which the slide rods 86 are extended as will be evident in Fig. 14. The sensing slide 69 is formed from sheet metal and in affording the lugs 87, a pair of metal strips 88 are extended across the upper surface of the slide 69 and are bent downwardly to afford the lugs 87. These strips 88 afford a surface upon which the matrix 68 is mounted or supported, and along the side edges of the sensing slide 69, rolled beads 89 are afforded for engaging the end edges of the matrix to hold the same in position. Adjacent the front edge of the slide 69, positioning lugs 90 are formed for engagement with the forward edge of the matrix 68. Thus a matrix 68 may be moved forwardly into position on the strips 88 and in engagement with the positioning elements 89 and 90, and means are afforded for releasably holding the matrix in this position. For this purpose, a strip 91 is positioned along the top of the slide 69 between the strips 88, and a downwardly extending end 92 on the strip 91 serves as a mounting for releasable fastening means that may engage the rear edge of the matrix 68. Thus a slidable latch 94 has elongated vertical slots 95 formed therein through which guide screws 93 are extended into threaded relationship to the supporting portion 92. The latch 94 is thus mounted for vertical movement, and after a matrix has been slid into position, the latch 94 may be moved to an upper position wherein it engages the rear edge of the matrix 68. When the latch 94 is in its lower position of Fig. 14, it is disposed just rearwardly of a transverse strip 96 that extends between the stationary arms 85, and when the latch is in this position, the sensing slide 69 is held against movement and the machine will operate either to print each printing device 31 or skip each printing device 31 in accordance with the setting of the reversing slide 97, as will hereinafter become evident.

The sensing slide 69 is driven yieldingly in a forward direction through its sensing stroke and is positively returned to its initial or retracted position of Fig. 17 by operating means that are associated with the printing device advancing means so that the sensing slide 69 is operated through its sensing stroke as an incident to each cycle of operation of the printing device advancing means. Thus as will be evident in Fig. 14, a bracket 98 of inverted U-shaped form is fixed on the lower face of the sensing slide 69 and this bracket affords downwardly extending arms that are slotted at their lower ends to receive and embrace a transverse rod 99 of the actuating means. The rod 99 is mounted at its opposite ends in the upwardly extending arms of a U-shaped rocker 100 that is pivoted on a stationary shaft 101 extended between the sides of the stationary frame 80. The rod 99 is thus guided for arcuate movement about the axis of the shaft 101, and such movement is imparted to the rod 99 by means of a lost-motion linkage that is connected at one end to the rod 99 and at the other end to the rocker 25 of the printing device advancing means. This lost-motion linkage includes a first link 102 pivoted at one end to the rod 99, and another link 105 has one end pivoted to a connecting lug 104 formed on the rocker 25 near its upper end. The link 102 has an elongated longitudinal slot 103 formed therein through the left-hand end of which a headed stud 107 extends into threaded engagement with the link 105. A similar longitudinal slot 106 in the link 105 has a headed stud 108 extended through the right-hand portion thereof into threaded engagement with the link 102, and the relationship of these parts is such that the links 102 and 105 may move relative to each other from normal relationship shown in Fig. 14 to an extended relation. The links 102 and 105 are normally held in the relationship shown in Fig. 14 by latch means which includes a rocker 110 pivoted at 109 on the link 102, and a spring 113 acting between a pin 111 on the rocker 110 and a pin 112 on the link 102 acts to urge a transversely extending latch pin 115 on the rocker 110 into engagement with the upper edge of the link 105. A clearance recess 114 in the link 102 opposite the location of the latch pin 115 enables the pin 115 to enter a slot 116 or a slot 117 formed in the upper edge of the link 105.

When the parts are in the position shown in Fig. 14, the pin 115 engages the notch 116, and hence when the rocker 25 starts in a clockwise direction, Fig. 6 from its rest position, the motion of the rocker will be transmitted to the link 102 so as to start the sensing slide 69 on its forward sensing stroke. This takes place prior to the time when the advancing movement of the lowermost printing device 31 has started, and the sensing movement of the sensing slide 69 continues until the end of the sensing stroke is reached, or until the movement of the sensing slide is blocked by engagement of a tab on the matrix 68 with a shoulder 34 of a detecting element that has been set by a tab carried on the lowermost printing device 31 in the magazine 5. When this occurs, the releasable connection afforded by the pin 115 and the notch 116 is broken and the forward movement of the link 105 continues. At substantially the forward end of the stroke of the rocker 25, the latch pin 115 enters the slot or notch 117 of the link 105, and hence as soon as the return or rearward movement of the rocker 25 is initiated, the rearward or return stroke of the sensing slide 69 will be initiated. When this return movement has been completed so that the links 87 of the slide 69 engage the arms 85, the pin 115 is cammed out of the notch 117 and as the return movement of the rocker 125 continues, the notch 116 is moved into alignment with the latch pin 115. At the end of the return movement of the rocker 25, the pin 115 again engages the notch 116 so as to be conditioned for imparting the next sensing stroke to the slide 69. With the mechanism that is thus provided, the forward or active sensing stroke of the slide 69 is completed and the latch pin 115 is released from the notch 116 before the advancing movement of the lowermost printing device in the magazine 5 has been started, and the restoring movement of the sensing slide 69 is completed long prior to the time when the next printing device drops off of the surface 28a of the carrier bars and into position ahead of the shoulders 34 of the carrier bars. Thus the detecting elements 70 that have been previously actuated will return to their normal positions of Fig. 6 in ample time for subsequent actuation by the tabs of the succeeding printing device as this printing device drops into position in front of the shoulders 34. It may here be pointed out that in the principal embodiment of the invention as herein illustrated, the detecting elements 70 are restored to their normal positions by gravity but that this may be accomplished in a positive manner as will hereinafter be described.

The sensing movement of the sensing slide 69 is utilized to control the operation of the platen mechanism of the machine and in the present instance this is accomplished through the medium of control mechanism that is rendered effective by power means which are in turn governed by a selector clutch C that is rendered effective selectively under the governing action of the movements of the sensing slide 69. The selector clutch C is best shown in Figs. 18 to 21 and is effective to control and cause rocking movement of a rock shaft 125 which in the course of such rocking movement sets control mechanism associated with the selector reversing slide 97 so as to control the operation of the platen mechanism in accordance with the operation of the sensing means.

Figure 18:
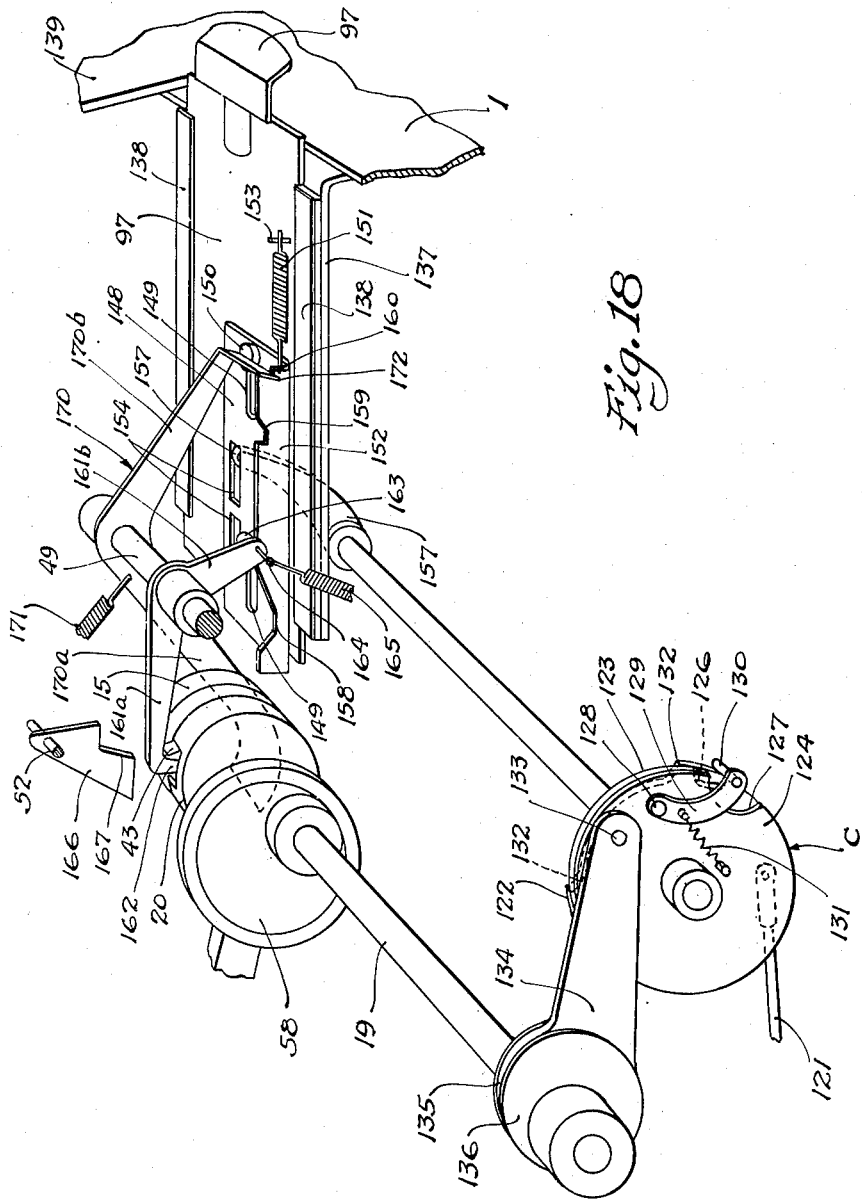
Figs. 18, 19, 20 and 21 are fragmentary perspective views of a portion of the control mechanism of this invention wherein the operative parts of this mechanism are shown in different operative positions.

The sensing clutch C comprises three discs 122, 123 and 124, these discs being in a face to face relationship and the disc 123 being disposed between the other two discs and being fixed to the shaft 125. The disc 124 is arranged normally so as to be capable of rocking movement relative to the shaft 125 and this disc constitutes the driving element of the clutch C. The disc 124 is in turn driven through a rocking movement by means of an eccentric 136 fixed on the shaft 19 and having a strap 135 thereon which is formed at one end of a link 134. The other end of the link 134 is connected by a pin 133 that is eccentrically located on the driving disc 124 of the clutch. The disc 124 is thus actuated through a rocking movement each time the drive shaft 19 operates through its one-revolution cycle, and when the shaft 125 is to be rocked, the driving disc 124 is operatively connected to the disc 123 so that the disc 123 will rock in unison with the disc 124 throughout a substantial portion of the rocking movement of the disc 124. To effect such a connection, the disc 124 has a clutch pawl 129 pivoted thereon by a pin 128, and a laterally projecting clutch pin 130 near the end of the pawl 129 is adapted to be moved by a rocking movement with the pawl 129 into a notch 126 formed in the disc 123. A spring 131 acting on the pawl 129 urges the pawl toward its clutch-engaging position, and such engagement is governed by the rotative disc 122 which thus constitutes the control disc of the clutch C. Thus as will be evident in Figs. 18 to 21, the control disc 122 has an elongated slot formed in the edge thereof, the right-hand end of the slot 132 is normally so disposed, as shown in Fig. 18 that the outer periphery of the disc 122 holds the pin 130 in a position such that the pin 130 cannot enter the notch 126. When the driving disc 124 is rocked in a counterclockwise direction from the normal position shown in Fig. 18, when the clutch C is to be engaged, the control disc 122 is rocked in a clockwise direction from the position shown in Fig. 18, and hence the pin 130 is allowed to enter into the notch 126 in the driven disc 123. Such movement is permitted by reason of an enlarged clearance slot 127 that is formed in the edge of the disc 124. Hence the driving disc 124 is effective to rock the shaft 125 in a counterclockwise direction to the end of its counterclockwise range of movement, whereupon the movement is reversed and the parts are returned toward the position shown in Fig. 18. In the operation of the machine, the control disc 122 is restored to the position shown in Fig. 18 prior to the completion of the return movement of the driving disc 124, and hence at substantially the end of the return or clockwise stroke of the driving disc 124, the pin 130 will meet the inclined right-hand end edge of the slot 132 so as to cam the pin 130 out of the notch 126. This causes the clutch C to be released and the parts associated with the rock shaft 125 will be disposed in their normal positions.

The rocking movement that is required in the control disc 122 is imparted thereto by an operating connection that is extended from the sensing slide 69. Thus as will be evident in Fig. 13 of the drawings, a rod 118 is extended downward from the transverse member of the U-shaped rocker 109, this rod 118 being extended through a suitable slot formed in the bottom of the frame 89. At the lower end of the rod 118, an elongated transverse pin 120 is extended laterally and the rear end of a connecting link is pivoted to the pin 120. The forward end of the link 121 is connected to the control disc 122 as shown in Figs. 18 to 21. Thus when the sensing slide moves through this sensing stroke, a corresponding rocking movement is imparted to the arm 118 so as to move the link 121 in an endwise direction. The arrangement is such that when a tab on the matrix 68 engages a shoulder 84 on a detecting element 70, the rocking movement of the disc 122 will be insufficient to move the slot 132 of the control disc into alignment with the notch 126 of the driven disc 123, and under such circumstances the rock shaft 125 will remain in its rest position as shown in Fig. 18 of the drawings. When, however, the setting of the detecting elements is such as to allow completion of the forward sensing movement of the slide 69 to a relationship such as that shown for example in Fig. 16, the notch or recess 132 is moved into position opposite the notch 126 so as to thereby permit engagement of the clutch C, and under such circumstances the rock shaft 125 is moved through a rocking movement so as to set the control mechanism that is associated with the selector reversing slide 97.

The control mechanism that is thus set by rocking movement of the shaft 125 is best shown in Figs. 18 to 21, and this control mechanism is so arranged that it acts as a delay means whereby the setting of the control mechanism in the cycle in which a particular printing device 31 is moved into the aforesaid intermediate position is effective to exercise its governing function in the next cycle in which the particular printing device 31 is moved into the printing station of the machine. With reference to such additional control mechanism, attention is also directed to Figs. 7, 8 and 11 wherein certain relationship of the elements to the clutch mechanism is shown. The desired control of the platen mechanism is exercised by such additional control mechanism through the medium of a supplemental control or stop lever 161 that is mounted on the shaft 49 for cooperation with the platen clutch 20. The supplemental control lever 161 is in the nature of a bell crank and has an arm 161a that is extended rearwardly over the clutch 20 in a relationship similar to the stop lever 47a and the stop lever 161a has a tooth 162 at the end thereof that is adapted to be disposed in the path of the lug 43 of the clutch dog so as to hold this clutch dog in its released position even though the primary stop lever 47a may be shifted to its release or ineffective position. The supplemental stop lever 161 has another arm 161b that extends downwardly and forwardly, and a spring 165 acting on a pin 164 on the arm 161b normally urges the stop lever 161 toward an ineffective position such as that shown in Fig. 20 of the drawings, and this ineffective position is determined by engagement of the upper edge of the arm 161a with a shoulder 167 formed on a latch plate 166 that is pivotally supported on the shaft 52. When the stop lever 161 is moved to its effective position of Figs. 7 and 19, a spring, 169, acting on the latch 166 moves the lower end of the latch 166 into position over the end of the stop lever 161 to hold the same in the aforesaid effective position. The latch 166 has a laterally projecting ear 168 formed thereon as shown in Figs. 7 and 8, and when the latch 51 is moved toward its released relationship by the action of the pin 49, Fig. 8, the latch 166 is moved out of the path of the stop lever 161 so that this stop lever may under the influence of its spring 165 move to its ineffective position in engagement with the shoulder 167, unless however some other restraining influence is at this time effective upon the stop lever to prevent such retraction of the stop lever 161, as will hereinafter be described.

Figure 19:
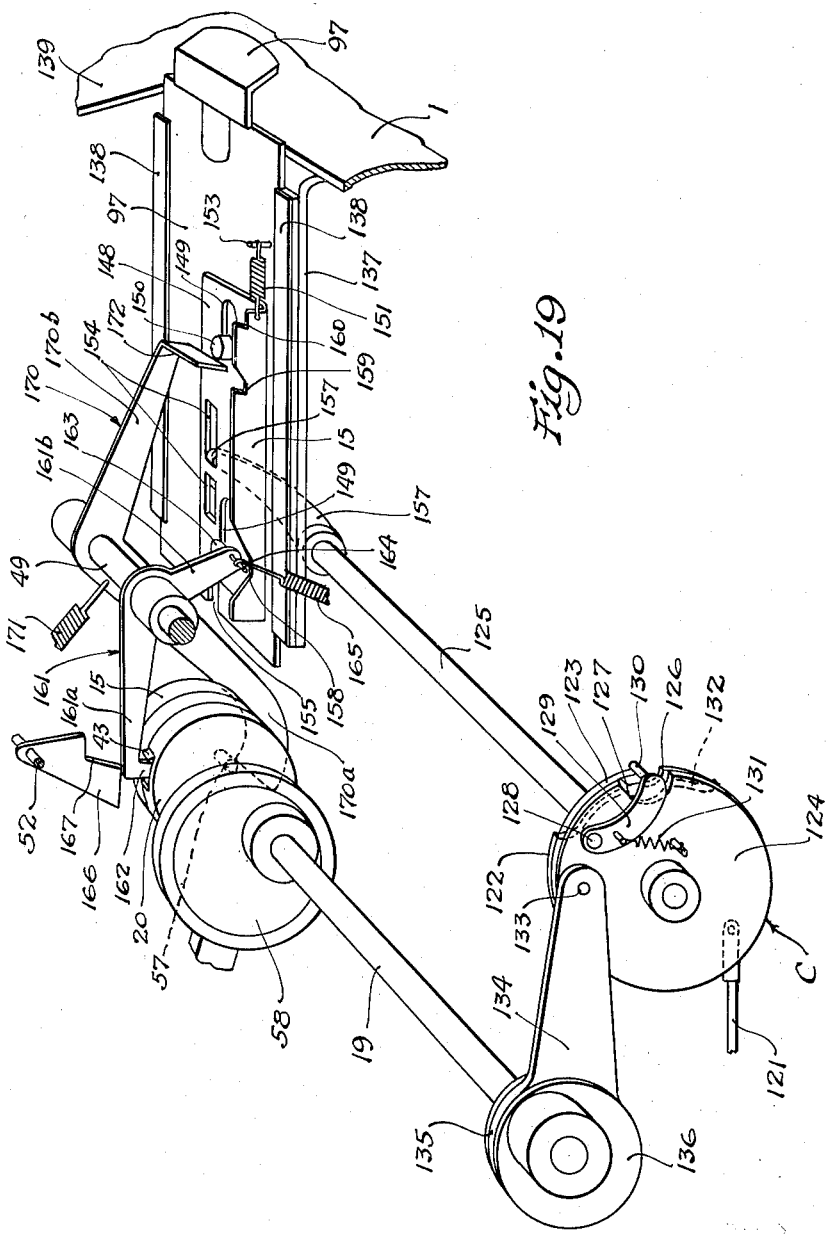

The stop lever 161 may be moved into the aforesaid effective position of Figs. 7 and 19 by a control slide 148 which is moved in one direction to a set position by the rock shaft 125 and which is then latched in the set position and is held in such latched position by means that are released in each rotative cycle of the main shaft 19.

The control slide 148 is made from sheet metal and has longitudinal slots 149 formed therein through which headed studs 150 extend downwardly into engagement with the reversing slide 97, thereby to mount the slide 148 for limited reciprocating or setting movement on the top of reversing slide 97, and a spring 151 secured to the slide 148 and anchored at its other end on the reversing slide by a pin 153 urges the control slide 148 forwardly to a normal position wherein the rear ends of the slots 149 engage the studs 150. Along one edge of the control slide 148 an upwardly turned flange 152 is afforded, and this flange is arranged so that the upper edge thereof may be disposed beneath a laterally extending pin 163 on the arm 161B of the supplemental stop lever 161 to hold this stop lever in its effective position. Such a relationship is shown in Fig. 18 of the drawings, but it will be observed that the flange 153 has a relatively long recess 158 formed therein which, when disposed beneath the pin 163, permits movement of the stop lever 161 to its ineffective position, provided of course that the latch 166 is also released at this same time.

The control plate 148, as above pointed out, normally is disposed with the rear ends of the slot 149 in engagement with the studs 150, and when a setting movement is imparted to the control slide 148 so as to move the same rearwardly, means are effective to latch the control in its rearward or set position. For cooperation with such latching means, the flange 152 has a pair of spaced notches 159 and 160 formed therein, and a latch 170 mounted on the shaft 49 is adapted for cooperation with one or the other of these notches. The latch 170 has an arm 170b with a laterally turned latching ear that is adapted to engage either of the notches 159 or 160; and a spring 171 acting on another arm 170a of the latch 170 normally urges the latch to its effective position. The arm 170a constitutes a release element that extends into position beneath the pin 57 of the master clutch 15, and the arrangement is such that the arm 170a is engaged so as to release the latch 170 after the master clutch 15 has progressed through substantially 90° of its rotative cycle.

Figure 21:
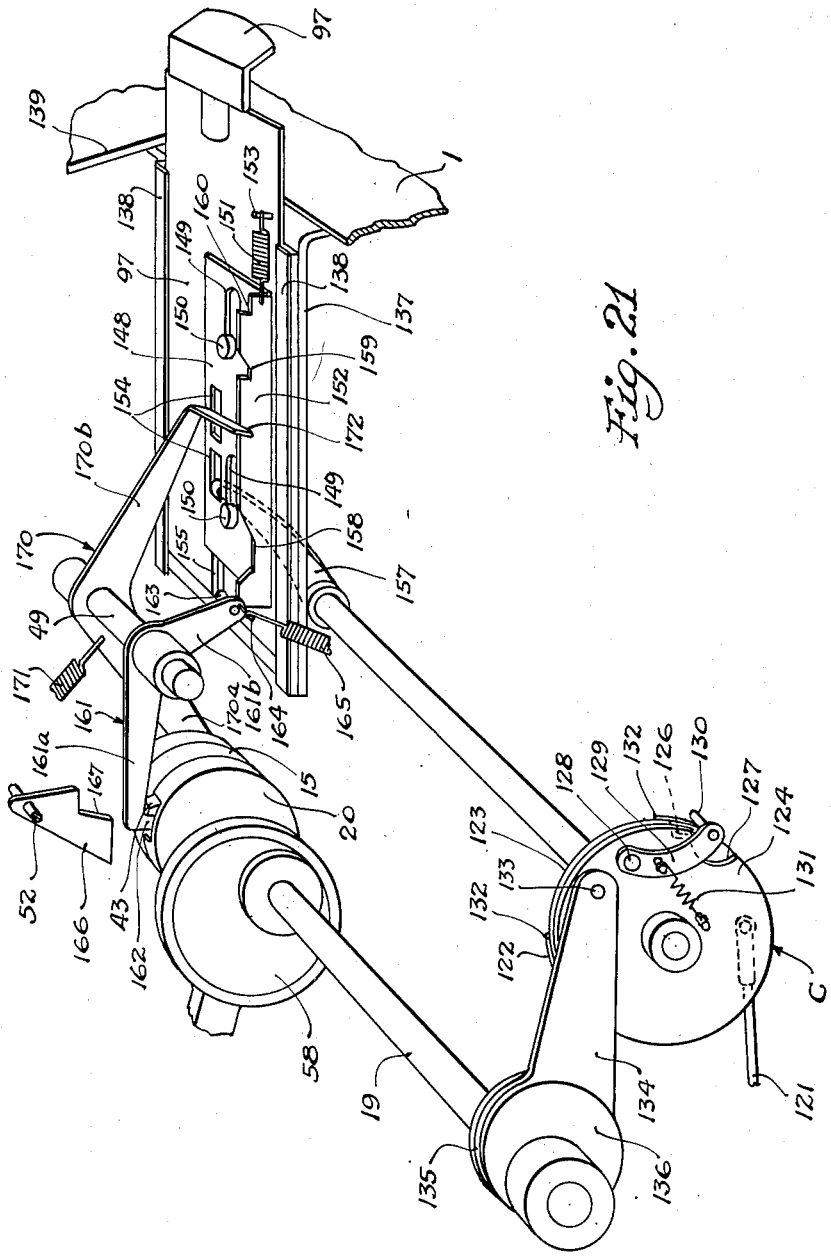

The control slide 148 may be utilized to attain either skip-tab or print-tab operation of the machine, and this is accomplished by changing the setting of the reversing slide 97 upon which the control slide 148 is mounted. Thus as will be evident in Figs. 18 and 23, the reversing slide 97 upon which the control slide 148 is mounted is arranged for shifting movement between an inner print-tab setting and an outer skip-tab setting. To enable this to be accomplished, the reversing slide 97 is mounted in guides 138 carried on a mounting plate 137 so as to guide the slide 97 for front to rear setting movement. A pin 144 on the lower face of the slide 97 projects downwardly through a slot 97a in the stationary supporting plate 137, and a latch 140 is associated with the pin 144 beneath the plate 137 so that the slide 97 will be held in either position to which it is adjusted. The latch 140 is in the form of an elongated lever pivoted on a pivot screw 141 at one end and having a spring 145 connected at 146 to the other end of the lever and anchored on a pin 147 on the bottom of the stationary plate 137. The latch lever 140 is thus urged against the side of the pin 144, and notches 142 and 143 formed in the side of the lever 140 serve to engage the pin 144 selectively so as to hold the slide 97 in either of its adjusted positions. Thus when the slide is in its rear or print-tab setting, the normal position of the control slide 148, Fig. 19, is such that the recess 158 is disposed beneath the pin 163 of the supplemental stop lever 161, while in the forward or skip-tab setting of the reversing slide 97, the normal position of the control slide 148, Fig. 21, is such that the recess 148 is disposed forwardly of the pin 163 which is therefore disposed in such circumstances on the upper edge of the flange 152 so as to thereby hold the supplemental stop lever 161 in its effective position.

From either of the normal positions of the control slide 148 as thus determined, the control slide may be actuated rearwardly through a setting movement by the action of the rock shaft 125. For this purpose a radial arm 157 is fixed on the shaft 125 so that its upper end is normally positioned within a relatively long slot 156, Figs. 5 and 23, formed in the stationary plate 137, and when thus located, the upper end of the lever 157 is disposed beneath the lower face of the control slide 148. Above the slot 156, the control slide 148 has a pair of slots 154, and these slots are so arranged that one or the other of the slots will be disposed in position for engagement with the actuating arm 157. When the reversing slide is in its rear or print-tab setting as shown in Fig. 19 of the drawings, the arm 157 is in a rocking movement of the shaft 125 moved upwardly into the forward end of the slots 154 and engages the rear edge of this slot to impart a rearward or setting movement to the control slide 148. When the reversing slide 97 is in its forward or skip-tab setting, the rear slot 154 is disposed over the arm 157 so that this arm will, in a rocking movement of the shaft 125, engage the rear edge of the slot 154 to impart a setting movement to the control slide 148. Thus with respect to a print-tab setting of reversing slide 97, the control slide 148 is moved from the position shown in Fig. 19 to the position shown in Fig. 18 in this movement, the sloping rear edge of the recess 158 acts on the pin 163 to shift the supplemental stop lever 161 to its effective position. When the set position of Fig. 18 has been reached, the control slide 148 is latched in its set position by engagement of the latching ear 172 with the notch 160. The latch 166 also moves to its effective position, and the supplementary control lever 161 is maintained in its effective position through the cooperation of these two latches, even though one or the other of these latches may be released at certain times in the machine cycle.

When the reversing slide 97 is in its outer or skip-tab setting, the notch or recess 158 is normally positioned forward of the pin 163 so that this pin is held in its upper position with the supplemental stop lever 161 in its effective position. When the shaft 125 is rocked through a setting movement, the control slide is moved forwardly to the set position of Fig. 20, thereby to dispose the recess 158 beneath the pin 163, and unless the latch 166 is effective, this permits the supplemental stop lever 161 to move to its retracted or ineffective position. The control slide 148 is held in the set position of Fig. 20 by engagement of the latch ear 172 with the notch 159

*Print-tab operation*

To attain print-tab operation of the machine, the reversing slide 97 is disposed in the rearward or inward position of Figs. 18 and 19, and the control slide 148 therefore normally tends to assume the normal forward position of Fig. 19 in which the recess 158 is aligned with the pin 163. Thus the supplemental stop lever 161 tends to assume a released or retracted position such as that shown in Fig. 20 and in this position the stop lever 161 is ineffective. When a printing device bearing a tab in a position opposite to the position of a tab on the matrix 68 is disposed at the bottom of a magazine 5, the corresponding detecting element 70 is disposed in its blocking position. Hence when the sensing slide 69 starts upon its sensing stroke, the aforesaid tab on the matrix 68 engages the set detecting element 70 so that the sensing slide 69 does not move through its full stroke. Therefore, the clutch C will not be engaged and the rock shaft 125 will remain stationary. The control slide 148 therein remains in its normal position of Fig. 19 and the supplemental stop lever 161 remains in its ineffective position. Hence with respect to this particular printing device, the supplementary stop lever 161 will be ineffective, and a printed impression will be made from the printing device when it reaches printing position. It will be recalled of course that there is a delay action so that this control is effective in what may be termed the second cycle of operation of printing device advancing means, or in other words, such control is effective in the cycle when the related printing device 31 is moved into printing station.

In the event that a printing device at the bottom of the magazine 5 does not have a tab in any position corresponding to the tabs on the matrix 68, all of the detecting elements 70 that are located opposite the tabs on the matrix 68 will remain in their normal positions so that the slots 71 thereof will be aligned with the tabs on the matrix. Hence when the sensing slide 69 starts through its sensing stroke, the tabs on the matrix 68 will enter the aligned slots 71 in the detecting elements 70 and consequently the sensing slide 69 will move through its full sensing stroke. In such movement the means including the connecting link 121 are effective to rock the control plate 122 of the clutch C in such a manner as to permit this clutch to become engaged. Such clutch engagement causes the shaft 125 to be rocked in a clockwise direction from the position shown in Fig. 19, and this in turn moves the control slide 148 rearwardly until the latch 170 engages with the notch 160, thereby to hold the control slide 148 in the set position that has been established. In the course of movement of the control slide 148 to its set position, the rearward cam surface of the recess 158 engages the pin 163 so as to cam the supplemental stop lever 161 to its effective position. The foregoing setting movement of the control slide 148 takes place in the cycle of machine operation wherein the related printing device 31 is moved into the intermediate station of the printing device guideway. Hence the supplementary stop lever 161 is disposed in its effective position at the end of this cycle, so that it may be effective in the next succeeding cycle to prevent engagement of the platen clutch 20.

In this next cycle of machine operation, the operator will depress the consecutive key 17 so as to release the stop levers of the several clutches including the stop lever 47 of the platen clutch 20. The master clutch 15 and the printing device advancing clutch 21 will therefore be caused to engage, but although the stop lever 47 of the platen clutch has been moved to its ineffective position, the platen clutch 20 does not engage in this cycle because the supplemental stop lever 161 is in the effective position shown in Figs. 9, 18 and 19. When the operation of the machine through a skip cycle is thus initiated, the latch 166 is in the position shown in Fig. 11 so that it is disposed above the supplementary stop lever 161, but at this time the stop lever 161 is not in contact with the lower edge of the latch 166. Early in the machine cycle however the pin 57 on the master clutch 15 engages the arm 170A of the latch 170, thereby to release the latch 170 and permit the control plate 148 to be withdrawn in a forward direction to its normal position by the spring 151. The stop lever 161 then rocks to such a position that the stop lever is engaged with the lower end of the latch 166 as shown in Fig. 19, but even in this position, the lug 162 on the stop lever 161 still remains in engagement with the lug 43 of the clutch pawl 39 so that the clutch is not allowed to engage. Such backing off movement of the clutch lever 161 does, however, withdraw the nose or lug 162 thereof from the opening 144 of the driven element of the clutch. At substantially 270° in the machine cycle, the latch 166 is moved to its ineffective position, and in order that this may be accomplished when the platen clutch 20 is not in operation, the latching plate 51 of the master clutch 15 has a laterally projecting pin 173 thereon as shown in Fig. 10 of the drawings. The pin 173 is arranged to engage the latch plate 51 of the platen clutch 20 so that the latch plate 166 will be released at the aforesaid point in the machine cycle. A similar releasing movement is imparted to the latch 166 by the action of the pin 173 early in the machine cycle by virtue of the rocking movement of the plate 51 when the stop lever 56 of the master clutch 15 is moved to its ineffective or released position, but at this early point in the cycle, the control slide 148 is still in its effective or set position so that the rocking of the latch 66 at this time is nothing more than an idle movement and does not release the stop lever 161 for movement to its ineffective position. Thus, as will be evident in Fig. 9 of the drawings, the pin 53 on the stop lever 56 of the main or master clutch 15 rocks the latch 51 of the master clutch 15 in a counterclockwise direction, Fig. 9, as the pin 53 is moved upwardly into alignment with the notch 55, and when the latch plate 51 moves into position beneath the pin 53, the latch 166 is allowed to return toward its effective position of Fig. 9.

Thus at the start of the machine cycle, the control slide 148 is latched in its set position by the latch 170 so that the control slide holds the stop lever 161 in its set position during the relatively short time that the latch 166 is disengaged. After return of the latch 166 to its effective position and at about 90° in the machine cycle, the control slide 148 is released for movement to its normal position of Fig. 19. After this and before the end of the cycle, the rock shaft 125 may be again effective to impart a setting movement to the control slide 148, but in the event that no such setting movement is imparted to the control slide, the release of the latch 166 at substantially 270° in the machine cycle will allow the supplementary stop lever 161 to move to its ineffective position.

*Skip-tab operation*

Figure 20:
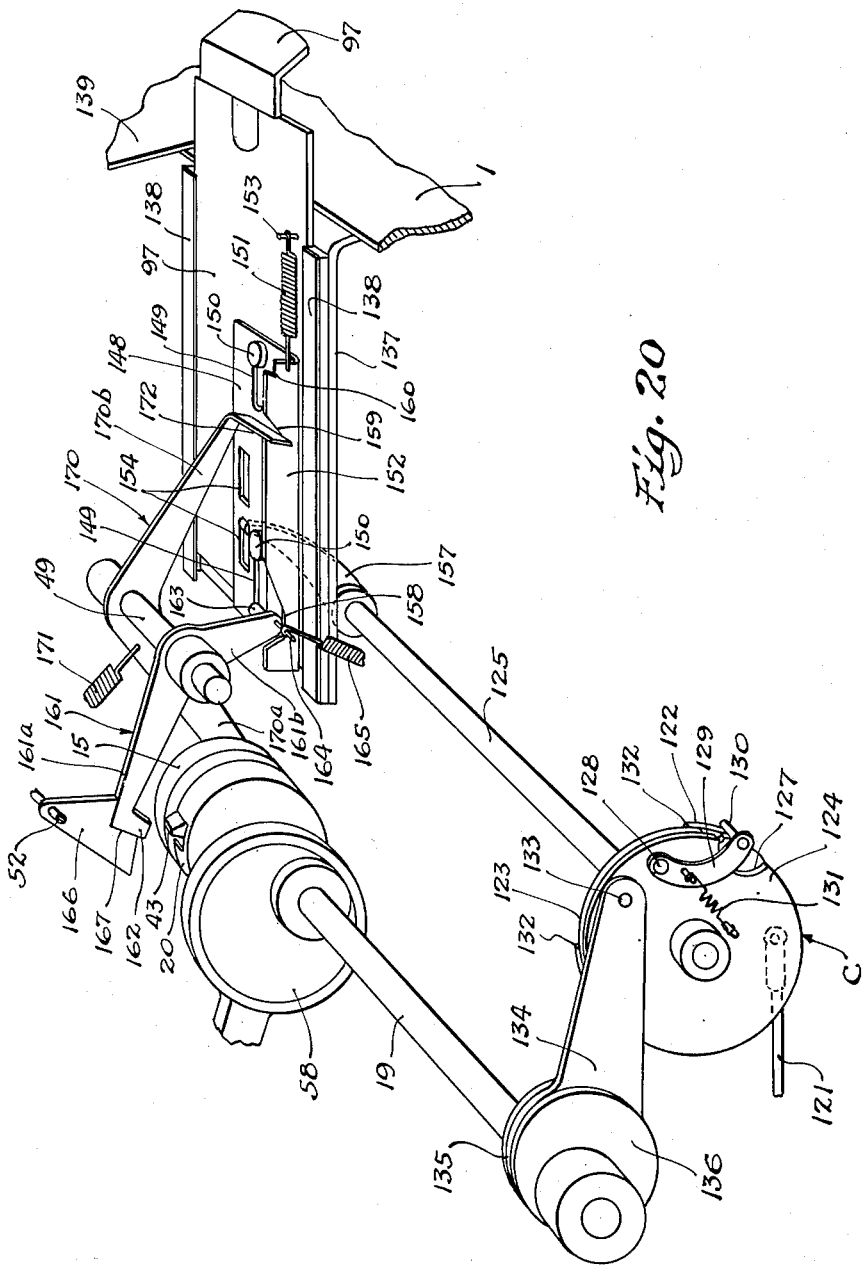

When the machine is to be operated in accordance with the skip-tab mode of operation, the reversing slide 97 is withdrawn to its forward position of Figs. 20 and 21. When this has been done, the normal forward position of the control slide 148 is such that the portion of the flange 152 rearwardly of the recess 158 is disposed beneath the pin 163 of the supplementary stop lever. Thus, the normal action of the control slide 148 is to prevent engagement of the platen clutch 20, when the platen clutch 20 is to be allowed to engage, the control slide 148 is operated through a setting movement from the position shown in Fig. 21 to the position shown in Fig. 20. Thus when a printing device in the lowermost position in the supply magazine 5 has a tab thereon in a position opposite a tab on the matrix 68, the detecting elements 70 will be set so as to block the sensing slide 69 in its sensing stroke and this prevents operation of the rock shaft 125. Hence the control slide 148 remains in its normal position of Fig. 21 so as to thereby prevent operation of the platen.

When the lowermost printing device 31 does not have a tab in any of the positions corresponding to the tabs on the matrix 68, the sensing slide 69 is permitted to move throughout this complete sensing stroke and by causing engagement of the clutch C, and the rock shaft 125 is therefore operated so as to set the control slide 148 in the position shown in Fig. 20 of the drawings. Such setting movement of course occurs after the latch 166 has returned to its effective position of Fig. 21 so that the supplementary stop lever 161 remains in its effective position. Near the end of the machine cycle, however, at the time when the pin 57 of the master clutch acts through the related plate 51 and the pin 173 to rock the latch 166 to its released position, the supplementary stop lever 161 moves to the fully released position of Fig. 20 and hence the platen clutch 20 will be allowed to engage in the next machine cycle in the normal manner.

In the next machine cycle, which will of course be a print cycle of operation, the latch 170 is disengaged at about 90° in the machine cycle and the spring 151 moves the control plate 148 rearwardly from the position shown in Fig. 20 to the position shown in Fig. 21, thereby to return the supplementary stop lever 161 to its effective position in engagement with the peripheral edge of the driven member of the platen clutch 20. When the platen clutch 20 is disengaged by the action of the normal stop lever 47, the nose of the stop lever 161 will be aligned with the opening 44 and further forward movement of the slide 148 will take place so as to cause the nose 162 of the stop lever 161 to enter the opening 44 of the clutch 20. The supplemental stop lever 161 will of course remain in this effective position until such time as the control slide 148 is again moved to its set position, and in this event, the mechanism will function as above described to cause the machine to operate through a print cycle.

When the reversing slide 97 is shifted from one setting to the other, the previously made selection is preserved so that the indicated print or skip operation of the machine is attained despite the change or new setting thereof. For this purpose the latch 170 is made resilient sidewardly in order to permit the drawing out of the reversing slide 97 even in the event that the latch 170 is in engagement with the notch 160 of the control slide 148. If the latch 170 is in engagement with this notch 160 when the reversing slide 97 is drawn out, i. e., if the printing plate 31 sensed in the last machine cycle should not be printed, the latch 170 springs free from the control slide 148 so that the latter, under the action of the spring 151, is drawn to its foremost position on the reversing slide 97, the latch 170 being at the same time swung somewhat so that it can spring back and rest the latching ear 172 thereof upon the flange 152 of the control slide. When the control slide 148 is drawn forward by means of the spring 151 to the forward position on the reversing slide 97, the flange portion rearwardly of the recess 158 will occupy a position beneath the pin 163 of the supplemental stop lever 161 so that this lever is held in its effective position in engagement with the pawl nose 43 of the platen clutch 20. The parts occupy then the position shown in Fig. 21. Consequently the printing plate 31 that was sensed in the last cycle before the adjustment of the reversing slide 97 will not be printed in the next cycle, in spite of the drawing out of the reversing slide. If however the latch 170, before the drawing out of the reversing slide 97 rests against the upper edge of the flange 152 between the notches 159 and 160 and the pin 163 of the supplemental stop lever 161 therefore rests in the notch 158 so as to be set for printing during the next cycle, the ear 172 of the latch 170, immediately at the beginning of the drawing out of the reversing slide 97, engages the notch 159 in the flange 152 so that during the continued outward movement of the reversing slide 97, the control slide 148 is held against movement, and after the drawing out of the reversing slide 97 the control slide 148 is disposed in its rear or set position with the notch 158 still situated below the pin 163 of the stop lever 161. Thus the stop lever 161 remains out of engagement with the pawl nose 43 of the platen clutch 20 so that the printing plate 31 that was sensed during the last cycle before the drawing out of the reversing slide 97 will be printed in the next cycle although the reversing slide has been drawn out between these two cycles.

Alternative embodiment

As hereinbefore described, the detecting elements 70 are restored to their normal positions by gravity, but if desired, power actuated means may be utilized, and such means are illustrated in Fig. 22 of the drawings. As shown in Fig. 22, a mounting bracket 174 of U-shaped form is secured on an internal surface of the base 1, and a rock shaft 175 is journalled in the arms of the bracket 174. A pair of arms 176 extend upwardly from the rock shaft 175 so as to support a restoring plate 177 on the upper ends of the arms 176 and just beneath the detecting elements 70. The arrangement is such that the downwardly turned forward ends 77 of the detecting elements 70 are disposed in front of the forward edge of the restoring plate 177; and by rocking movement of the shaft 175, the restoring plate 177 may be rendered effective to positively restore the detecting elements 70 to their normal positions. For this purpose, an arm 178 extends downwardly from one end of the rock shaft 175 and a spring 183 acting on the arm 178 normally urges the rock shaft in such a direction as to retract the restoring plate 177 in a rearward direction, thereby to permit freedom of setting movements of the detecting elements 70. For the purpose of actuating the restoring mechanism through an operative stroke, a link 179 is extended forwardly from the lower end of the arm 178, and at its forward arm the link 179 is connected to the downwardly extending arm 180a of a bell crank 180 that is mounted for rocking movement on the shaft 49. The bell crank 180 has a forwardly extending arm 180b and this arm is so disposed that it will be engaged by a pivot pin 181 which serves as the pivot for the clutch dog 182 of the printing device advancing clutch 21. The arrangement of the parts is such that the arm 180b is actuated through the desired restoring movement somewhat after the midpoint in the cycle of operation in the machine, and hence the detecting elements 70 are restored in a positive manner prior to the time when the next printing device 31 drops downwardly into position for cooperation with the detecting elements 70.

Double matrix

In the use of a machine of the general character to which this invention relates, it is often desirable to make impressions from a selected group of printing devices but to prevent the making of impressions from certain printing devices that fall in this group. For example, a user may wish to make printed impressions from the printing devices that are tabbed to indicate that the person to which such printing device pertains is a purchaser of butter, but the user of the machine may wish to exclude from his mailing list all such purchasers of this class who buy through cooperative buying organizations or who have a poor credit rating. Such a mode of selection may be accomplished by the selector of the present invention through the use of a double matrix 185 which as shown in Fig. 25 of the drawings includes two matrices 185a and 185b that in general form correspond with the matrix 68. The matrices 185a and 185b are placed one on top of the other and are secured together by suitable means such as a plurality of bent wire clips 186 that are extended into the spacing flanges 33 of the two matrices.

With the double matrix 185 that is thus afforded, the upper matrix 185b carries one or more tabs in positions indicative of the class or classes of purchasers with respect to which printed impressions are to be made. As shown in Fig. 25, a notched tab 187 is disposed in position 3 which is the position that pertains to purchasers of butter.

Figure 26:
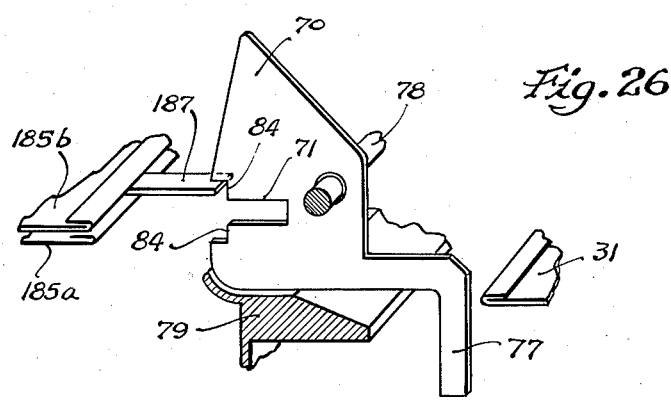
Figs. 26, 27 and 28 are fragmentary perspective detail views similar to Figs. 15, 16 and 17 by showing the detecting members of the selector mechanism in different alternate positions when a control device of the kind shown in Fig. 25 is employed.
Figure 27:
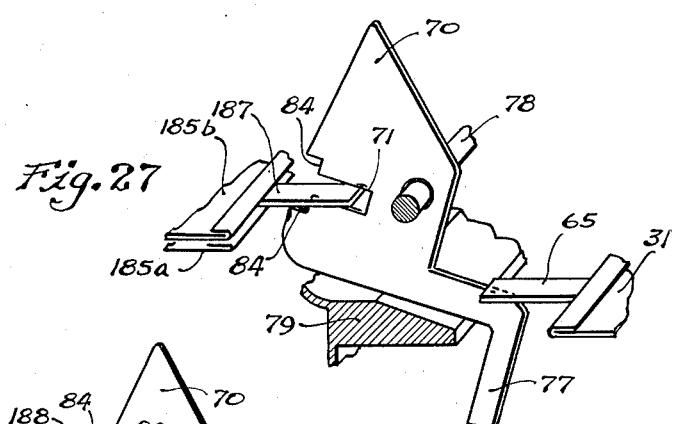

The lower matrix 185a is utilized to afford an indication of the classes of purchasers or persons with respect to which the user does not wish to make printed impressions. Thus, tabs 188 are illustrated in Fig. 25 as being disposed in positions 10 and 12 of the lower matrix 185b, these tabs being arranged to indicate respectively that printed impressions are not to be made with respect to persons who buy through cooperative stores or who have a bad credit rating. The double matrix that is thus afforded is secured in position on the sensing slide 69, and the reversing slide 97 is placed in its forward or skip-tab position that is shown in Figs. 20 and 21. It will be recalled that in this setting of the reversing slide 97, the machine normally tends to skip all of the printing devices that are passed through the machine, and it is only when a full sensing stroke is made by the sensing slide 69 that the control slide 148 is set to the position of Fig. 20 so as to cause the machine to operate through a printing cycle. Thus as will be evident in Fig. 26 of the drawings, the tab 187 of the upper matrix 185b is normally aligned with the upper shoulder 84 of the related detecting element 70 so that unless this particular detecting element is actuated to its set position, the tab 187 will cause the movement of the sensing slide to be stopped, and the control slide 148 will remain in its normal position wherein it prevents printing. When however a printing device 31 bearing a tab in a position corresponding to the position of the tab 187 moves downwardly into sensing position, the related detecting element 70 is set to the position shown in Fig. 27. This moves the notch 71 into alignment with the tab 187 so that unless other tabs prevent operation of the sensing slide 69, this slide will move through its full stroke and will set the control slide 148 to the position shown in Fig. 20 which will result in the performance of a printing operation with respect to the related printing device 31.

Figure 28:
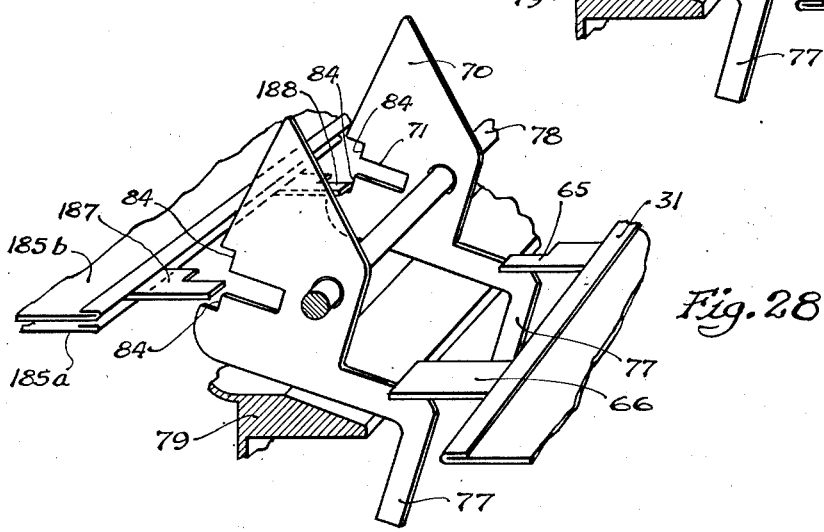

The lower matrix 185a may, however, in the circumstances above described, serve as a dominating influence which will prevent a printing operation. Thus, as will be evident in Fig. 28, the sensing of a tab on a printing device 31 in a position opposite one of the tabs 188 on the lower matrix 185a serves to set the related detecting element into such a position that the tab 188 will engage the lowermost shoulder 84, and hence the sensing movement of the sensing slide 69 will be relatively short, even though the detecting element opposite the tab 187 may have been set into alignment with this tab as hereinbefore described. This, of course, prevents operation of the control slide 148 to its set position, and as a result the printing device 31 will be skipped when it reaches printing position in the machine.

From the foregoing description it will be apparent that the present invention enables sensing of the identifying means on printing devices to be performed by moving the printing devices toward and into operative sensing contact with the elements of the sensing mechanism, and that it enables this to be performed in such a way that the printing devices move into cooperative engagement with the elements of the sensing device as the printing devices move downwardly into the lowermost position into the supply magazine of the machine. Thus, through the use of the arrangement made possible by the present invention, the sensing mechanism may be located in a conveniently accessible position, usually near the rear edge of the frame of the printing machine.

It will also be evident that the present invention affords a matrix selector wherein the matrix is disposed in a conveniently located position, that it enables the matrix in such a selector to be afforded by the use of printing devices of substantially the same character as the printing devices that are to be sensed by the selector mechanism.

It will also be apparent that the present invention affords a matrix selector in which a plurality of matrices may be utilized so that one such matrix will control the machine in one sense while another matrix will control the mechanism in a reverse or opposite sense, thereby to enable one matrix to operate according to the print-tab system of control while another matrix operates according to the skip-tab system of control.

Thus, while I have illustrated and described preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a printing machine having a printing device guideway along which printing devices each adapted to bear identifying means at one or more identifying tab positions thereon are adapted to be advanced one by one and in a step by step manner into and then out of a printing station disposed on said guideway, a supply magazine at one end of said guideway in which a stack of printing devices may be disposed, printing device advancing means for withdrawing the lowermost printing device from said magazine and advancing the same forwardly along said guideway, impression means at said printing station, control means for governing the operation of said impression means, and selector means governing said control means and including detecting means disposed at the bottom of said magazine for cooperation with the identifying means of the lowermost printing device in said magazine, said detecting means being in the form of a plurality of individually shiftable and slotted elements each having an integral portion extended adjacent the bottom rear portion of said magazine an extent to be contacted and thereby identifiably shifted by the identifying tabs on a lowermost printing device in said magazine, said selector means also including a sensing slide reciprocable in the direction of the slots in said detecting elements immediately prior to the feeding of a lowermost printing device forwardly from said magazine whereby the identifiable location of said slots relative to the leading edge of said sensing slide may be sensed immediately prior to the feeding of said lowermost one of said printing devices.

2. In a printing machine having a printing device guideway along which printing devices each adapted to bear identifying means at one or more identifying positions thereon are adapted to be advanced one by one and in a step by step manner into and then out of a printing station disposed on said guideway, a supply magazine in which a stack of printing devices may be disposed for downward movement by gravity as the lowermost printing devices are successively withdrawn horizontally from the magazine, a printing device advancing means for withdrawing the lowermost printing device horizontally from said magazine and advancing the same along said guideway, impression means at said printing station, control means for governing the operation of said impression means, and selector means governing said control means and including detecting means in the form of a row of aligned and individually shiftable plate elements each having an integral slotted front portion and each having an integral rear portion, each of said integral rear portions being extended toward the bottom of said magazine an extent to be contacted by the identifying means of a lowermost printing device in said magazine to a position to be withdrawn therefrom as it moves downwardly in said magazine and arranged to be released for return to their normal positions as such lowermost printing device is withdrawn from said magazine.

3. In a printing machine having a printing station through which printing devices each adapted to bear identifying means at one or more identifying positions thereon are adapted to be passed one by one and in a step by step manner, impression means at said station for producing printed impressions from individual printing devices disposed at said station, means affording a printing device guideway along which printing devices may be advanced one by one into and through said printing station, a supply magazine at one end of said guideway in which a stack of such printing devices may be positioned, printing device advancing means for withdrawing said devices one by one from the bottom of said magazine and advancing such printing devices along said guideway to printing position, a plurality of individually settable detecting elements each shiftably mounted at the bottom of said magazine for setting movement between normal and set positions, each of said detecting elements having an integral rear portion extended toward the bottom rear portion of said magazine an extent to be contacted by the said identifying means as each of said printing devices sequentially assumes a bottommost position in said magazine immediately prior to being fed therefrom whereby said detecting elements may be accordingly shifted and set by such contact, control means for governing the operation of said impression means, a sensing head for sensing the movement of said detecting elements and operable in accordance with the extent of its movement to variantly govern said control means in response to such sensing of said detecting elements said sensing head being movable toward said detecting elements immediately prior to withdrawal of a lowermost printing device from said magazine whereby movement of said detecting elements between normal and set positions may be sensed, and means on said sensing head for holding a replaceable matrix in position for sensing cooperation with said detecting elements to govern the extent of movement of said sensing head.

4. In a printing machine having a printing station through which printing devices each adapted to bear identifying means at one or more identifying positions thereon are adapted to be passed one by one and in a step by step manner, impression means at said station for producing printed impressions from individual printing devices disposed at said station, means affording a printing device guideway along which printing devices may be advanced one by one into and through said printing station, a supply magazine at one end of said guideway in which a stack of such printing devices may be positioned, printing device advancing means for withdrawing said devices one by one from the bottom of said magazine and advancing such printing devices along said guideway to printing position, settable detecting elements shiftably mounted at the bottom of said magazine for setting movement between normal and being in the form of a row of aligned plates each having an integral rear portion positioned at a point adjacent the bottom of said magazine set positions and to be engaged and set by the identifying means on the lowermost printing device in said magazine, control means for governing the operation of said impression means, a sensing head mounted rearwardly of said magazine for sensing movement in a forward direction immediately prior to the withdrawal of the lowermost printing device from the bottom of said magazine and operable in accordance with the extent of its movement to variantly govern said control means in response to such sensing of said detecting elements, and means on said sensing head for holding a replaceable matrix in position for sensing cooperation with said detecting elements to govern the extent of movement of said sensing head.

5. In a printing machine having a printing station through which printing devices each adapted to bear identifying means at one or more identifying positions thereon are adapted to be passed one by one and in a step by step manner, impression means at said station for producing printed impressions from individual printing devices disposed at said station, means affording a printing device guideway along which printing devices may be advanced one by one into and through said printing station, a supply magazine at one end of said guideway in which a stack of such printing devices may be positioned for sequential gravity movement to a lowermost position therein, printing device advancing means for wtihdrawing said devices one by one from the bottom of said magazine and advancing the same along said guideway to printing position, settable detecting elements shiftably mounted at the bottom of said magazine and each having an integral portion extended within the path of downward movement of the identifying means carried on the lowermost printing device positionable at the bottom of said magazine whereby said detecting elements may be shifted by engagement therewith, control means for governing the operation of said impression means, and sensing means operable to sense said detecting elements and to govern said control means in response to such sensing of said detecting elements, said sensing means including a sensing plate movable forwardly in the direction of said detecting elements immediately prior to withdrawal of the lowermost printing device from said magazine whereby the relative shifting of said detecting elements may be sensed.

6. In a printing machine having a printing station through which printing devices each adapted to bear identifying means at one or more identifying positions thereon are adapted to be passed one by one and in a step by step manner, impression means at said station for producing printed impressions from individual printing devices disposed at said station, means affording a printing device guideway along which printing devices may be advanced one by one into and through said printing station, a supply magazine at one end of said guideway in which a stack of such printing devices may be positioned with their identifying means projecting in a line therefrom, printing device advancing means for withdrawing said devices one by one from the bottom of said magazine and advancing such printing devices forwardly along said guideway to printing position, settable detecting elements shiftably mounted at the bottom of said magazine for setting movement between normal and set positions and each having an integral portion positional immediately below and in the path of the identifying means on the lowermost printing device in said magazine as such printing devices move into such lowermost position in said magazine whereby said detecting elements may be set accordingly as said integral portions are engaged by said identifying means, said detecting elements each having a rearwardly facing notch formed therein, control means for governing the operation of said impression means, a sensing head disposed rearwardly of said magazine for sensing movement in a forward direction and generally toward said notches to sense the same and operable in accordance with the extent of its movement to variantly govern said control means in response to such sensing of said detecting elements, and means on said sensing head for holding a replaceable matrix in position for sensing cooperation with said detecting elements and the notches therein to govern the extent of movement of said sensing head.

7. In a printing machine having a printing station through which printing devices each adapted to bear identifying means at one or more identifying positions along one edge thereof are adapted to be passed one by one and in a step by step manner, impression means at said station for producing printed impressions from individual printing devices disposed at said station, means affording a printing device guideway along which printing devices may be advanced one by one into and through said printing station, a supply magazine at one end of said guideway in which a stack of such printing devices may be positioned with the identifying means thereof disposed at the side of said magazine that is remote from said printing station, printing device advancing means for withdrawing said devices one by one from the bottom of said magazine and advancing such printing devices along said guideway to printing position, settable detecting elements shiftably mounted at the bottom of said magazine and along said side thereof that is remote from said printing station and each having an integral portion extended in the path of said identifying means thereby being in position to be engaged and set by the identifying means on the lowermost printing device in said magazine, control means for governing the operation of said impression means, and sensing means including a replaceable matrix mounted at said remote side of magazine for sensing cooperation with said detecting means and operable to govern said control means in response to such sensing of said detecting elements by said matrix.

8. In a selector mechanism for a printing machine in which printing devices each adapted to bear projecting identifying means at one or more identifying positions thereon are adapted to be advanced one by one and in a step by step manner from a storage station in the machine, settable detecting means in the form of a row of aligned elements shiftably mounted adjacent the storage station in position to be engaged and set by the identifying means on said printing devices as the printing devices each sequentially assume a common position in the storage station immediately prior to being advanced from such a common position, said elements each having a portion extended into the area normally occupied by said projecting identifying means at said common position, means permitting the printing devices to operatively engage said detecting means whereby the detecting means are shifted to a set position, and sensing means movable toward the detecting means to sense the set position of the detecting means.

9. In a printing machine through which printing devices each adapted to bear identifying means at one or more identifying positions may be passed one by one, a plurality of shiftable detecting elements disposed for actuation in a predetermined direction by such identifying means from normal positions to set positions, said detecting elements each having a slot formed in one edge thereof with corresponding shoulders disposed at opposite sides of and facing in the same direction as the open end of said slot whereby the relative positions of detecting elements as determined by the actuation thereof may be sensed by abutting means slidable toward and extendable into said slots, a sensing slide movable toward and away from said slots, and means for supporting abutment elements of two classes on said slide in positions such that abutment elements of the first class will abut the shoulders on one side of said slots when said detecting elements are in their normal positions and will be aligned with said slots when said detecting elements are in their set positions while abutment elements of the second class will be aligned with said slots when the detecting elements are in said normal positions and will abut the shoulders on the other side of said slots when said detecting elements are in their set positions, said sensing slide being movable toward said detecting elements to sense the same immediately after actuation of said detecting elements by said identifying means.

10. In a printing machine through which printing devices each adapted to bear identifying means at one or more identifying positions may be passed one by one, a plurality of detecting elements mounted for rocking movement by such identifying means from normal positions to set positions, said detecting elements each having a slot formed in one edge thereof substantially radially with respect to the rocking axis of said elements and with corresponding shoulders at opposite sides of the open end of said slot whereby the relative positions of detecting elements as determined by the actuation thereof may be sensed by abutting means slidable toward and extendable into said slots, a sensing slide movable toward and away from said slots, and means for supporting said abutment elements on said slide in either of two relationships such that abutment elements in the first such relationship will abut the shoulders on one side of said slots when said detecting elements are in their normal positions and will be aligned with said slots when said detecting elements are in their set positions, while the abutment elements in the second of such relationships will be aligned with said slots when the detecting elements are in said normal positions and will abut the shoulders on the other side of said slots when said detecting elements are in their set positions, said sensing slide being movable toward said detecting elements to sense the same immediately after actuation of said detecting elements by said identifying means.

11. In a printing machine through which printing devices each adapted to bear identifying means at one or more identifying positions may be passed one by one, a plurality of shiftable detecting elements disposed for actuation in a predetermined direction by such identifying means from normal positions to set positions, said detecting elements each having a slot formed in one edge thereof with corresponding shoulders disposed at opposite sides of and facing in the same direction as the open end of said slot, a sensing slide movable toward and away from said slots, and means for supporting abutment elements on said slide in either of two relationships such that abutment elements in the first such relationship will abut the shoulders on one side of said slots when said detecting elements are in their normal positions and will be aligned with said slots when said detecting elements are in their set positions, while the abutment elements in the second of such relationships will be aligned with said slots when the detecting elements are in said normal positions and will abut the shoulders on the other side of said slots when said detecting elements are in their set positions.

12. In a printing machine having a printing station through which printing devices each adapted to bear identifying means at one or more identifying positions thereon are adapted to be passed one by one and in a step by step manner along a path including a sensing station, an intermediate station and then into said printing station, impression means at said station for producing printed impressions from individual printing devices disposed at said printing station, printing device advancing means for imparting such movement to the printing devices, an impression clutch and an advancing clutch for respectively controlling operation of said impression means and said advancing means, selector means including a sensing head for sensing the identifying means of said printing devices at sensing station, control means for said impression clutch including a control slide shiftable between normal and set positions and effective in one of its positions to prevent engagement of said impression clutch and in the other of its positions to permit engagement of said platen clutch, power means for setting said control slide from said normal position to said set position and including a selector clutch rendered effective under control of said sensing head, means for latching said control slide in set position, and means effective on said latch means in each cycle of machine to release said control slide from its set position in the cycle of machine operation following the cycle of machine operation in which the control slide was set.

13. In a printing machine having a printing station through which printing devices each adapted to bear identifying means at one or more identifying positions thereon are adapted to be passed one by one and in a step by step manner along a path including a sensing station, an intermediate station and then into said printing station, impression means at said station for producing printed impressions from individual printing devices disposed at said printing station, printing device advancing means for imparting such movement to the printing devices, one-revolution impression and advancing clutches for respectively controlling operation of said impression means and said advancing means, means including main stop levers for said clutches for concurrently causing engagement of said clutches, selector means including a sensing head for sensing the identifying means of said printing devices at sensing station, control means for said impression clutch including a normally ineffective supplemental stop lever for said impression clutch and a control slide for governing said supplemental stop lever shiftable between normal and set positions and effective in one of its positions to dispose said supplemental stop lever in its effective position, and in the other of its positions to permit said supplemental stop lever to assume its normal ineffective position, power means for setting said control slide from its normal position to its set position and including a selecting clutch rendered effective under control of said sensing head, means for latching said control slide in set position, and means effective on said latch means in each cycle of machine operation to release said control slide from the set position in the cycle of machine operation following the cycle of machine operation in which the control slide was set.

14. In a printing machine having a printing station through which printing devices each adapted to bear identifying means at one or more identifying positions thereon are adapted to be passed one by one and in a step by step manner along a path including a sensing station, an intermediate station and then into said printing station, impression means at said station for producing printed impressions from individual printing devices disposed at said printing station, printing device advancing means for imparting such movement to the printing devices, one-revolution impression and advancing clutches for respectively controlling operation of said impression means and said advancing means, means including main stop levers for said clutches for concurrently causing engagement of said clutches, selector means including a sensing head for sensing the identifying means of said printing devices at sensing station, control means for said impression clutch including a normally ineffective supplemental stop lever for said impression clutch and a control slide for governing said supplemental stop lever shiftable between normal and set positions and effective in one of its positions to dispose said supplemental stop lever in its effective position, and in the other of its positions to permit said supplemental stop lever to assume its normal ineffective position, power means for setting said control slide from its normal position to its set position and including a selecting clutch rendered effective under control of said sensing head, a first latch effective to latch said control slide in its set position, a second latch effective to latch said supplemental stop lever in its effective position, means effective in each cycle of machine operation after said second latch has become effective and prior to the time when said selecting clutch becomes effective to release said first latch to permit return of said control slide to its normal position, and means effective in each machine cycle after the time at which said selecting clutch is effective to release said second latch.

15. In a printing machine having a printing station through which printing devices each adapted to bear identifying means at one or more identifying positions thereon are adapted to be passed one by one and in a step by step manner along a path including a sensing station, an intermediate station and then into said printing station, impression means at said station for producing printed impressions from individual printing devices disposed at said printing station, printing device advancing means for imparting such movement to the printing devices, one-revolution impression and advancing clutches for respectively controlling operation of said impression means and said advancing means, means including main stop levers for said clutches for concurrently causing engagement of said clutches, selector means including a sensing head for sensing the identifying means of said printing devices at sensing station, supplemental control means for said impression clutch including a supplemental stop lever for said impression clutch and a control slide for governing said supplemental stop lever shiftable between normal and set positions and effective in one of its positions to dispose said supplemental stop lever in its effective position, and in the other of its positions to dispose said supplemental stop lever in its ineffective position, power means for setting said control slide from its normal position to its set position and including a selecting clutch rendered effective under control of said sensing head, independently releasable latch means respectively operable to latch control slide in set position, and said supplemental stop lever in the position to which it is moved by said slide in the movement of the slide to its set position, and means effective on said latch means in each cycle of machine operation to release said latches in succession to thereby preserve a setting of said supplemental stop lever that has been effected in a previous cycle while conditioning said control slide for a new setting movement.

16. In a printing machine having a printing station through which printing devices each adapted to bear identifying means at one or more identifying positions thereon are adapted to be passed one by one and in a step by step manner along a path including a sensing station, an intermediate station and then into said printing station, impression means at said station for producing printed impressions from individual printing devices disposed at said printing station, printing device advancing means for imparting such movement to the printing devices, one-revolution impression and advancing clutches for respectively controlling operation of said impression means and said advancing means, means including main stop levers for said clutches for concurrently causing engagement of said clutches, selector means including a sensing head for sensing the identifying means of said printing devices at sensing station, control means for said impression clutch including a reversing slide settable in either a first position or a second position, a normally ineffective supplemental stop lever for said impression clutch, and a control slide for governing supplemental stop lever mounted on said reversing slide and shiftable thereon between normal and set positions, means on said control slide effective when said reversing slide is in said first position and said control slide is in one of its positions to dispose said supplemental stop lever in its effective position, and effective when said control slide is in the other of its positions and said reversing slide is in its first position to permit said supplemental stop lever to assume its normal ineffective position, the movement of said reversing slide to its second position being effective to reverse the controlling action of said control slide with respect to said supplemental stop lever, power means for setting said control slide from its normal position to its set position and including a selecting clutch rendered effective to latch said control slide in its set position, a second latch effective to latch said supplemental stop lever in its effective position, means effective in each cycle of machine operation after said second latch has become effective and prior to the time when said selecting clutch becomes effective to release said first latch to permit return of said control slide to its normal position, and means effective in each machine cycle after the time at which said selecting clutch is effective to release said second latch.

CARL RICHARD BERNHAG.

REFERENCES CITED

The following references are of record in the file of this patent:

UNITED STATES PATENTS

| Number | Name | Date |
| --- | --- | --- |
| 1,503,822 | Duncan et al. | Aug. 5, 1924 |
| 1,599,623 | Rainey | Sept. 14, 1926 |
| 1,790,661 | Gollwitzer | Feb. 3, 1931 |
| 2,035,695 | Elliott | Mar. 31, 1936 |
| 2,070,549 | Hueber | Feb. 9, 1937 |
| 2,132,412 | Gollwitzer | Oct. 11, 1938 |
| 2,425,323 | Hueber | Aug. 12, 1947 |